US007228568B2

(12) United States Patent
Abe et al.

(10) Patent No.: US 7,228,568 B2
(45) Date of Patent: Jun. 5, 2007

(54) DATA RECORDING APPARATUS, DATA RECORDING METHOD, AND DATA TRANSFER SYSTEM

(75) Inventors: Miki Abe, Kanagawa (JP); Takafumi Hosoi, Tokyo (JP); Hiromi Matsuda, Kanagawa (JP); Masao Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 867 days.

(21) Appl. No.: 10/123,557

(22) Filed: Apr. 15, 2002

(65) Prior Publication Data

US 2002/0176576 A1  Nov. 28, 2002

(30) Foreign Application Priority Data

Apr. 17, 2001  (JP)  ............................. 2001-118317

(51) Int. Cl.
*G06F 13/00* (2006.01)
(52) U.S. Cl. ............................. 726/31; 726/26; 726/30
(58) Field of Classification Search ................ 711/11; 365/2, 5; 380/47, 277; 713/182–186; 726/26, 726/31
See application file for complete search history.

(56) References Cited

U.S. PATENT DOCUMENTS

| 5,048,085 A | * | 9/1991 | Abraham et al. ............ 713/159 |
| 5,530,235 A | * | 6/1996 | Stefik et al. ................ 235/492 |
| 5,982,675 A | * | 11/1999 | Fujimoto ................ 365/189.05 |
| 6,226,618 B1 | * | 5/2001 | Downs et al. ................ 705/1 |
| 6,772,340 B1 | * | 8/2004 | Peinado et al. ............. 713/168 |

FOREIGN PATENT DOCUMENTS

EP  1 008 989 A2  6/2000

OTHER PUBLICATIONS

Communication and Search Report from the European Patent Office, dated Oct. 12, 2006 for Application No. 02252593.5-1247.
R. Canetti et al., "Multicast Security: A Taxonomy and Some Efficient Constructions," INFOCOM 1999, 18th Annual Joint Conference of the IEEE Computer and Communications Societies Proceedings, Mar. 21-25, 1999, pp. 708-716, vol. 2, New York, NY.
M. Waldvogel et al., "The VersaKey Framework: Versatile Group Key Management," IEEE Journal On Selected Areas in Communications, IEEE Service Center, Sep. 1999, pp. 1614-1631, vol. 17, No. 9, Piscataway, NJ.

* cited by examiner

*Primary Examiner*—Kambiz Zand
*Assistant Examiner*—William S Powers
(74) *Attorney, Agent, or Firm*—Finnegan, Henderson, Farabow, Garrett & Dunner, L.L.P.

(57) ABSTRACT

The present invention is intended to significantly reduce the content data processing and transfer times by skipping root key checking processing, when transmitting a plurality of pieces of encrypted content data stored in a primary recording medium to a secondary recording medium along with key information of these plural pieces of content data, if the key information for a piece of content data to be transmitted from the primary recording medium is the same as the key information for an already transmitted piece of content data.

11 Claims, 17 Drawing Sheets

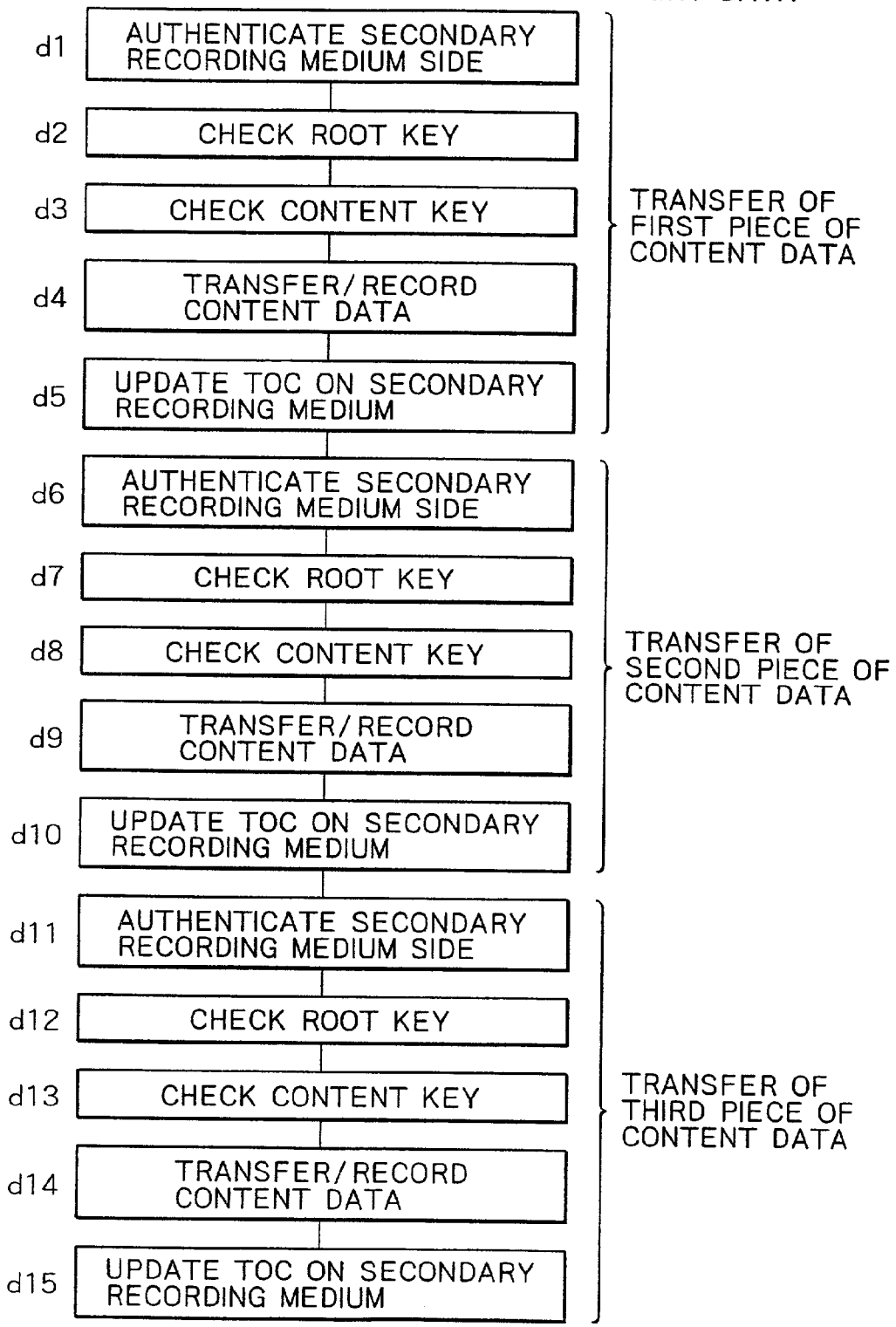

FIG. 3A

ENABLING KEY BLOCK (EKB) EXAMPLE 1
SENDING NODE KEY OF VERSION t TO
DEVICES DV0, DV1, AND DV2

| VERSION t | |
|---|---|
| INDEX | ENCRYPTED KEYS |
| 0 | E ( K(t)0 , K(t)R ) |
| 0 0 | E ( K(t)00 , K(t)0 ) |
| 0 0 0 | E ( K000 , K(t)00 ) |
| 0 0 1 | E ( K(t)001 , K(t)00 ) |
| 0 0 1 0 | E ( K0010 , K(t)001 ) |

FIG. 3B

ENABLING KEY BLOCK (EKB) EXAMPLE 2
SENDING NODE KEY OF VERSION t TO
DEVICES DV0, DV1, AND DV2

| VERSION t | |
|---|---|
| INDEX | ENCRYPTED KEYS |
| 0 0 0 | E ( K000 , K(t)00 ) |
| 0 0 1 | E ( K(t)001 , K(t)00 ) |
| 0 0 1 0 | E ( K0010 , K(t)001 ) |

FIG. 4

EXEMPLARY STRUCTURE OF EKB

| OFFSET ADDRESS | CONTENTS | SIZE (BYTE) |
|---|---|---|
| 0 | NUMBER OF NODE KEYS | 4 |
| 4 | DEPTH OF NODE KEY | 4 |
| 8 | EKB VERSION | 4 |
| 12 | RESERVED | 4 |
| 16 | EACH ENCRYPTED NODE KEY | 16×M |
| 16+16×M | RESERVED | 16 |
| 32+16×M | ENCRYPTED EKB VERSION | 8 |
| 40+16×M | ELECTRONIC SIGNATURE | 5 |

EXAMPLE OF DEVICE NODE KEY (DNK) OF SET0

| LEAF ID = SET0 |
| --- |
| KR ENCRYPTED BY LEAF KEY<br>E(K000, KR) |
| K0 ENCRYPTED BY LEAF KEY<br>E(K000, K0) |
| K00 ENCRYPTED BY LEAF KEY<br>E(K000, K00) |
| LEAF KEY = K000 |

① DECRYPT NODE KEY "K0" FROM LEAF KEY "K000"
  D {K000, E(K000, K0)} = K0

② DECRYPT ROOT KEY "KR'" FROM NODE KEY "K0"
  D {K0, E(K0, KR')} = KR'

③ DECRYPT CONTENT KEY "CK" FROM ROOT KEY "KR'"
  D {KR', E(KR', CK)} = CK

④ DECRYPT CONTENT DATA "A3D" FROM CONTENT KEY "CK"
  D {CK, E(CK, A3D)} = A3D

PROCESSING TO BE EXECUTED WHEN TRANSFERRING 3 PIECES OF CONTENT DATA (IF EKB VERSIONS ARE COMMON)

DATA RECORDING APPARATUS, DATA RECORDING METHOD, AND DATA TRANSFER SYSTEM

BACKGROUND OF THE INVENTION

The present invention relates generally to a data recording apparatus, data recording method, and data transfer system which are suitable in transferring/recording content data such as music.

A usage form is available in which content data such as music are stored in a primary recording medium such as a HDD (Hard Disc Drive) of a personal computer and the stored content data are transferred/recorded to another recording medium (a secondary recording medium) for the reproduction of music on the side of the secondary recording medium, for example. The content data herein denote main data such as music data, image data, game data, and computer software which are subject to distribution/transfer/use. Alternatively, the content data may be either with or without compression.

In this case, the HDD stores the content data such as music reproduced from a package medium such as CD-DA (Compact Disc Digital Audio) and DVD (Digital Versatile Disc) and the content data downloaded from an external music server for example via a communication network to which a personal computer concerned is connected. By connecting the personal computer to the recording apparatus, which is the secondary recording medium, the user of the computer copies, or moves the content data from the HDD to the secondary recording medium to reproduce the content data such as music by a reproducing apparatus compatible with this secondary recording medium.

The secondary recording medium may include a memory card based on the semiconductor memory such as a flash memory, a MiniDisc, which is a magneto-optical disc, a CD-R (CD Recordable), a CD-RW (CD Rewitable), a DVD-RAM, a DVD-R, and a DVD-RW for example.

The recorders/players compatible with these media as the recording apparatus and reproducing apparatus for the secondary recording media are in wide use and available in a variety of manners as stationary or portable recording/reproducing apparatuses. Each user can record/reproduce desired content data in accordance with user's preferences or devices.

It should be noted that, if content data are used in any of the above-mentioned manners, the copyright protection of these content data must be taken into account. For example, if the user is allowed to store content data into the HDD by use of a content data distribution service or by purchase of a package medium and then copy the stored content data absolutely into a secondary recording medium, the proper protection of copyright holders of these content data may be violated. In order to prevent this problem from happening, several arrangements have been proposed in the technologies and data processing for maintaining the copyright protection in handling content data as digital data. One of these arrangements is the SDMI (Secure Digital Music Initiative) standard. The data path formulated in the SDMI standard will be described later. For example, the data path is designed in consideration of both copyright protection and general user benefit (the right of duplication for private use) to properly perform the transfer/recording of the content stored in a personal computer having a HDD as the primary recording medium, for example the content data distributed from an external server via a network (hereafter referred to as network content) and the content data retrieved from the package media such as CD-DA and DVD which are reproduced on a disc drive unit such as a CD-ROM drive mounted on a personal computer or a disc drive unit which is externally connected to a personal computer (hereafter referred to as disc content).

In order to satisfy the requirements of both copyright and private duplication right in transferring content data from the primary recording medium such as HDD to the secondary recording medium such as MiniDisc for copying, a content data transfer method is proposed in which a data transfer apparatus (a device on the primary recording medium side) authenticates a data recording apparatus to be transferred (a device on the secondary recording medium side) and, only when the authentication is successful, the data transfer apparatus transfers content data to the data recording apparatus, the content data are transferred in an encrypted state, and the data recording apparatus decrypts the encrypted content data before recording.

A method of content data encryption and decryption is as follows for example. Assume that content data to be downloaded from an external server and stored in a HDD, which is the above-mentioned primary recording medium, are encrypted by content key CK. For the purpose of description, it is assumed that the HDD, which is the primary recording medium, stores content data "A3D" compressed by ATRAC3 (or any other data compression algorithm) and encrypted by content key CK.

It should be noted herein that, for the purpose of description, data y encrypted by a key x are expressed in E(x, y) and data decrypted by the key x from encrypted data E(x, y) are expressed in D{x, E(x, y)}.

Consequently, let the data compressed by ATRAC3 be "A3D" as shown above, then content data "A3D" encrypted by a content key CK are expressed in E(CK, A3D). If the data decrypted by the key CK from E(CK, A3D) are expressed in D{CK, E(CK, A3D)}.

The HDD, which is the primary recording medium, also stores the content key CK encrypted by a root key KR, namely E(KR, CK), along with encrypted content data E(CK, AD). For example, the encrypted content key E (KR, CK) is downloaded from an external server along with encrypted content data E(KR, A3D).

In this case, when transferring content data from the HDD, which is the primary recording medium, to the secondary recording medium, encrypted content data E(CK, A3D) and encrypted content data key E(KR, CK) may be transmitted.

The device on the secondary recording medium holds a root key KR, so that the device can decrypt the content key CK by use of the root key KR and then decrypt encrypted content data by the decrypted content key CK.

However, the root key KR is subject to change depending on the intention of copyright holder or other situations and therefore different root keys KR may be set to different pieces of content data. Also, the destinations of content distribution may be restricted by root key KR processing, a specific example of which will be described later.

For this purpose, data called an enabling key block (EKB) may be distributed. Each authorized terminal to which content data are transferred employs a method in which the root key can be confirmed by an EKB. Namely, an EKB is also distributed from a server along with the above-mentioned encrypted content data and encrypted content key and stored in the HDD.

In the above-mentioned circumstances, when transferring content data from the primary recording medium such as HDD to the secondary recording medium such as MiniDisc for copying, steps as shown in FIGS. 1A and 1B is taken as transfer processing.

FIG. 1A shows an example in which one piece of content data is transferred from a HDD to a MiniDisc to record the transferred content data thereto.

First, in step c1, the device on the primary recording medium side incorporating a HDD authenticates the device on the secondary recording medium side, which is a MiniDisc recording apparatus.

If the authentication is successful, then, in step c2, the device on the primary recording medium side performs the confirmation of the root key KR. Namely, the device on the primary recording medium side sends the EKB associated with the content data to be transmitted to the device on the secondary recording medium side to allow the same to determine the root key KR.

Next, in step c3, the device on the primary recording medium side sends the encrypted content key CK to the device on the secondary recording medium side. The device on the secondary recording medium side decrypts the encrypted content key CK by the above-mentioned confirmed root key KR.

In step c4, the device on the primary recording medium side sends the encrypted content data to the device on the secondary recording medium side. The device on the secondary recording medium side decrypts the encrypted content data by the above-mentioned decrypted content key CK, performs predetermined data processing on the decrypted content data, and records the resultant content data to the MiniDisc, which is the secondary recording medium.

Finally, in step c5, the device on the secondary recording medium updates management information known as U-TOC on the MiniDisc along with the writing of the content data thereto, upon which this recording operation is completed.

By following the above-mentioned steps, one piece of content data can be transferred/copied for recording while protecting its copyright.

FIG. 1B shows the recording of three pieces of content data by continuously transferring them from a HDD to a MiniDisc.

In this case, in steps d1 through d5 which are the same as the above-mentioned steps c1 through c5 shown in FIG. 1A, a first piece of content data is transferred and recorded. In steps d6 through d10 which are the same as the above-mentioned steps c1 through c5 shown in FIG. 1A, a second piece of content data is transferred and recorded. In steps d11 through d15 which are the same as the above-mentioned steps c1 through c5 shown in FIG. 1A, a third piece of content data is transferred and recorded.

For example, when transferring/recording two or more pieces of content data as above, the steps shown in FIG. 1A are repeated by the number of pieces of content data to be transferred.

SUMMARY OF THE INVENTION

For the transferring/recording of content data, the above-mentioned steps are theoretically followed; actually, however, the enhancement of the efficiency of content data transfer processing and the reduction in the processing time necessary for a series of transfer and recording operations are required.

In carrying out the invention and according to an aspect thereof, there is provided a data recording apparatus for encrypting a desired piece of content data selected from among a plurality of pieces of content data recorded to a primary recording medium and recording the encrypted piece of content data to a secondary recording medium which is different from the primary recording medium so as to reduce a processing time necessary for content data transfer, the data recording apparatus including: a reception block for receiving the encrypted content data generated for the selected desired piece of content data transmitted from the primary recording medium and an enabling key block for restoring a root key for a hierarchical key group; a memory for storing device node keys composed of a lowest hierarchical key set for the data recording apparatus for recording the desired piece of content data to the secondary recording medium and the hierarchical key group encrypted by the lowest hierarchical key; a restoration block for restoring the root key by use of the enabling key block received by the reception block and any one of the device node keys stored in the memory; a confirmation block for confirming a version of the enabling key block received by the reception block; and a prohibition control block for preventing the root key from being restored redundantly by the restoration block, if the enabling key block of the selected desired piece of content data is found common in version to a previous enabling key block by the confirmation block.

In carrying out the invention and according to another aspect thereof, there is provided a data recording method for recording a desired piece of encrypted content data selected from among a plurality of pieces of encrypted content data recorded to a primary recording medium to a secondary recording medium which is different from the primary recording medium, the data recording method including the steps of: firstly receiving an enabling key block for restoring a root key of a hierarchical key group transmitted from the primary recording medium; searching for the root key on the basis of any one of device node keys composed of a lowest hierarchical key stored in an internal memory of a recording apparatus capable of accommodating the secondary recording medium and the hierarchical key group encrypted by use of the lowest hierarchical key and the received enabling key block; secondly receiving encrypted content data from the primary recording medium after the searching for the root key; decrypting the encrypted content data received in the second receiving step; recording the content data decrypted in the decrypting step to the secondary recording medium; determining whether the enabling key block of the desired piece of encrypted content data selected from the plurality of pieces of encrypted content data recorded to the primary recording medium is common to an enabling key block of a desired piece of encrypted content data previously recorded from the primary recording medium to the secondary recording medium; and controlling to skip the first receiving step and the searching step if the enabling key block of the desired piece of encrypted content data selected from the plurality of pieces of encrypted content data recorded to the primary recording medium is found common in the determining step.

BRIEF DESCRIPTION OF THE DRAWINGS

These and other objects of the invention will be seen by reference to the description, taken in connection with the accompanying drawing, in which:

FIG. 1B is a flowchart describing a procedure to be executed on the sides of a HDD, which is a primary recording medium, and a MD, which is a secondary recording medium, when transmitting a plurality of pieces of content from the HDD to the MD;

FIG. 3A is a table listing enabling key blocks (EKBs) necessary for updating a root key and node keys;

FIG. 3B is a table listing EKBs necessary for updating node keys of a predetermined layer;

FIG. 4 illustrates a data structure of an EKB;

DETAILED DESCRIPTION OF THE PREFERRED EMBODIMENTS

Figure 1A:
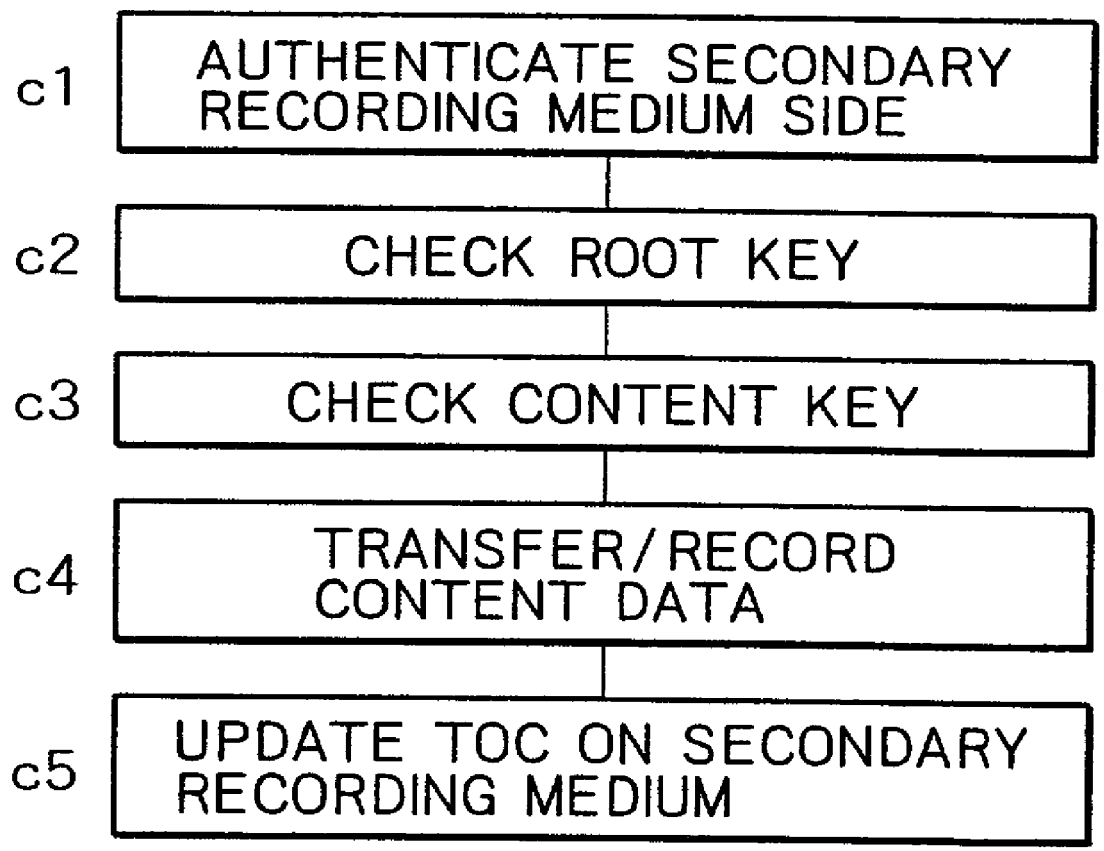
FIG. 1A is a flowchart describing a procedure to be executed on the sides of a hard disc (HDD), which is a primary recording medium, and a MiniDisc (MD), which is a secondary recording medium, when transmitting a single piece of content from the HDD to the MD.

This invention will be described in further detail in the following order by way of example with reference to the accompanying drawings:

1. Tree structure of encryption keys and EKB
2. System configuration
3. Data path of SDMI content
4. Exemplary configuration of data transfer apparatus (device on the primary recording medium side: PC)
5. Exemplary configuration of data recording apparatus (device on the secondary recording medium side: recording/reproducing apparatus)
6. Authentication processing
7. Content encryption scheme
8. Content transfer processing 1. Tree Structure of Encryption Key and EKB Before the specific description of a transfer system practiced as one embodiment of the invention, the structure of an encryption key for use in content distribution will be described. For this purpose, the following describes, with reference to FIGS. 2, 3A, 3B, and 4, an encryption key holding configuration and data distribution configuration in each of the content receiving devices in the case of distributing encrypted data from the content distributing side to the content receiving side.

Figure 2:
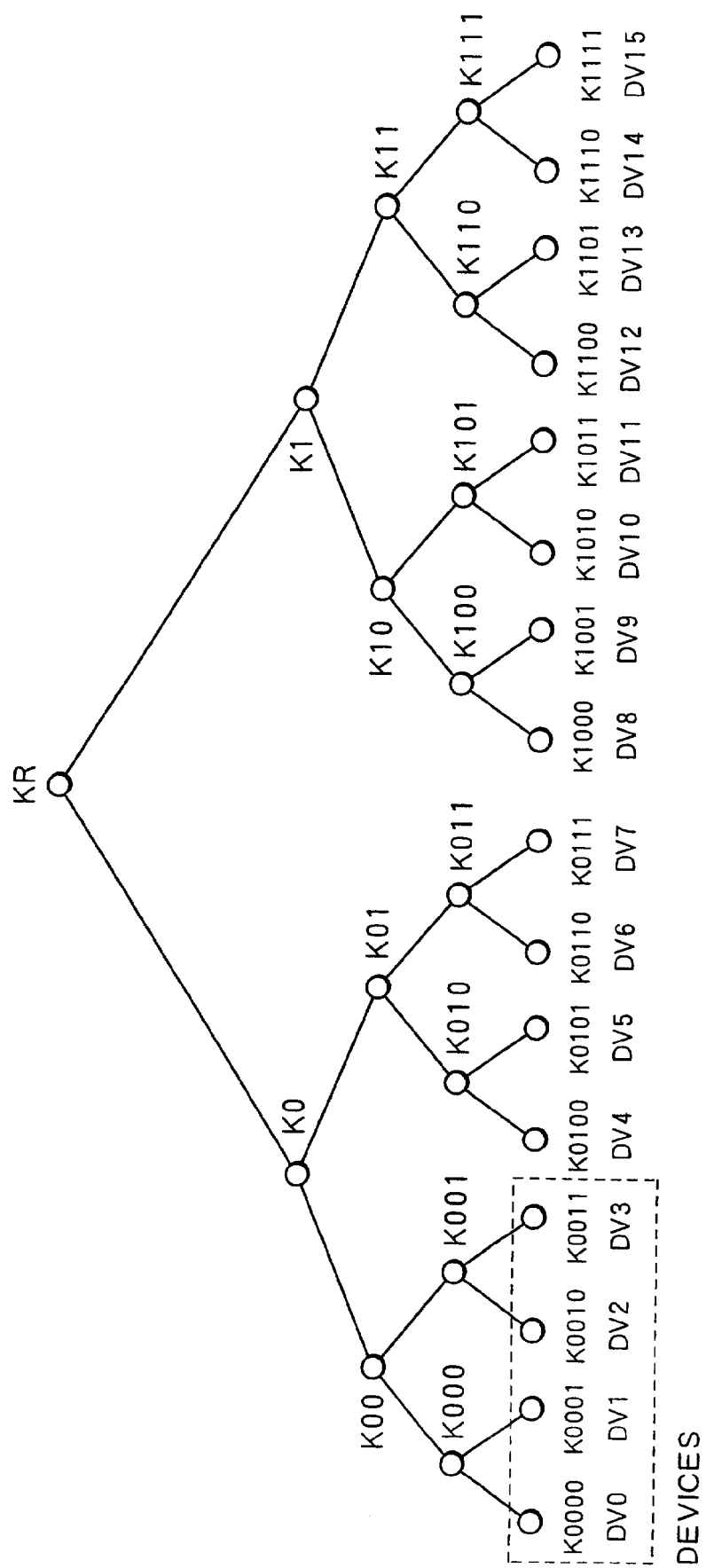
FIG. 2 illustrates a tree structure of encryption keys.

Now, referring to FIG. 2, there is shown a tree structure of encryption keys, in which DV0 through DV15 at the bottom are content receiving devices. Namely, each leaf in the hierarchical tree structure shown corresponds to each device.

At production, shipment, or later, each of the devices DV0 through DV15 stores in its memory a key set consisting of a key (a node key) allocated to the node from its own leaf to the root and a leaf key of each leaf in the hierarchical tree structure shown in FIG. 2. This key set is called a DNK (Device Node Key), a specific example of which will be described later with reference to embodiments of the invention. K0000 through K1111 at the bottom are leaf keys allocated to the devices DV0 through DV15 respectively. Keys K0 through K111 written to the nodes between the top key KR (the root key) and the bottom are called node keys. It should be noted that the node key may include the root key for the purpose of description.

In the tree structure shown in FIG. 2, device DV0 for example holds leaf key K0000, node keys K000, K00, and K0, and root key KR as the above-mentioned DNK. For example, in DNK, node keys K000, K00, and K0, and root key KR are held as encrypted by leaf key K0000. Likewise, device DV5 holds leaf key K0101, node keys K010, K01, and K0, and root key KR. Likewise, device DV15 holds leaf key K1111, node keys K111, K11, and K1, and root key KR.

The tree shown in FIG. 2 has only 16 devices DV0 through DV15 and the structure of this tree has four layers and is horizontally symmetrical. It will be apparent that the tree may have more devices and asymmetrical layers.

The information processing devices included in the tree structure shown in FIG. 2 include various types of information processing devices which use various recording media such as DVD, CD, MD, and flash memory incorporated in or externally attached to these information processing devices. In addition, in each of these information processing devices, various application service can exist together at the same time. Thus, the hierarchical tree structure, which is the content or key distributing configuration shown in FIG. 2 is based on a configuration in which different types of devices and applications as described above are coexistent.

In the system in which these various types information processing devices and applications are coexistent, a portion enclosed by dashed lines for example, namely devices DV0, DV1, DV2, and DV3, is set as one group which uses a same recording medium. For example, such processing is equally performed on the devices, in the enclosed portion, in this group as encrypting common content and sending the encrypted content from a provider, sending a content key to be commonly used by these devices, or encrypting the payment data for content fee and sending the encrypted payment data from these devices to a provider or a settlement institution. The institutions such as content providers and settlement institutions for performing data send/receive operations with each of the devices execute the processing of sending data collectively to the devices in the portion enclosed by dashed lines shown in FIG. 2, namely devices DV0, DV1, DV2, and DV3, as one group. Two or more groups of this kind exist in the tree shown in FIG. 2. The institutions such as content providers and settlement institutions which execute data send/receive operations with each of these devices function as message data distribution means.

It should be noted that the node keys and the leaf keys may be managed totally by one key management center or may be managed for each group by the message data distribution means such as the providers and settlement institutions which perform various data send/receive operations with each group. These node keys and leaf keys are renewed if key leakage occurs for example, the renewal processing being executed by the key management center, providers, or settlement institutions.

As seen from FIG. 2, in this tree structure, each of the four devices DV0, DV1, DV2, and DV3 included in one group has common keys K00, K0 as the node keys, and KR as the root key. Use of this node key sharing configuration allows the provision of a common content key for example only to devices DV0, DV1, DV2, and DV3.

For example, setting the commonly held node key K00 itself as a content key allows only devices DV0, DV1, DV2, and DV3 to set a common content key without executing the transmission of a new key. In addition, distributing a value E(K00, CK) obtained by encrypting a new content key CK by the node key K00 via a network or in a recording medium to the devices DV0, DV1, DV2, and DV3 allows only devices DV0, DV1, DV2, and DV3 to obtain the content key CK by decrypting the encrypted E(K00, CK) by use of the common node key held in each device.

If keys K0011, K001, K00, K0, and KR owned by device DV3 are found cracked by a hacker at a time point t, it becomes necessary to isolate the device DV3 from the system to protect the data to be subsequently sent/received by the system (the group of devices DV0, DV1, DV2, and DV3).

To achieve this, node keys K001, K00, and K0, and root key KR must be updated to new keys K(t)001, K(t)00, K(t)0, and K(t)R and sent these new keys to the devices DV0, D1, and DV2. It should be noted that K(t)aaa denotes the renewal key of generation t of key Kaaa.

Obviously, in content distribution, the node keys and the root key may be renewed depending on other requirements, such as the requirements from copyright holders or the convenience of system distribution.

For these reasons, the key renewal must be transmitted to each authorized device.

The following describes the processing of distributing a renewal key. A key renewal operation is executed by supplying a table composed of block data called an EKB shown in FIG. 4 for example to each device via a network or as stored in a recording medium. For example, if device DV3 is to be isolated as described above, an EKB is supplied to devices DV0, DV1, and DV2.

It should be noted that an EKB is constituted by an encrypted key for distributing the renewal key to the devices corresponding to the leaves constituting the tree structure as shown in FIG. 2. The EKB is also called a key renewal block (KRB).

The EKB shown in FIG. 3A is configured as block data having a data configuration which can be renewed by only the device needing node key renewal. The example shown in FIGS. 3A and 3B represents the block data formed to distribute the renewal node keys of version t to the devices DV0, DV1, and DV2 in the tree structure shown in FIG. 2.

For example, assume that keys K0011, K001, K00, K0, and KR have been cracked as described above, then device DV0 and device DV1 need K(t)00, K(t)0, and K(t)R as the renewal keys and device DV2 needs K(t)001, K(t)00, K(t)0, and K(t)R as the renewal keys.

As seen from the EKB shown in FIG. 3A, the EKB in this case includes a plurality of encrypted keys. The encrypted keys at the bottom are E(K0010, K(t)001). This is a renewal node key K(t)01 which is encrypted by the leaf key K0010 owned by the device DV2. The device DV2 can decrypt this encrypted key by its own leaf key to obtain K(t)001.

By use of key K(t)001 obtained by the decryption, encrypted keys E(K(t)001, K(t)00), second from bottom in FIG. 3A, can be decrypted to obtain a renewal node key K(t)00. Subsequently, encrypted keys E(K(t)00, K(t)0), second from top in FIG. 3A are decrypted to obtain a renewal node key K(t)0 and encrypted keys E(K(t)0, K(t)R) at the top are decrypted to obtain a renewal root key K(t)R.

On the other hand, in the devices DV0 and DV1, the leaf keys K0000 and K0001 and node key K000 are not included in a group to be renewed; necessary for the renewal keys are K(t)00, K(t)0, and K(t)R.

Hence, in the devices DV0 and DV1, encrypted keys E(K000, K(t)00), third from top in FIG. 3A, are decrypted to obtain a renewal node key K(t)00, encrypted keys E(K(t)00, K(t)0) are decrypted to obtain a renewal node key K(t)0, and encrypted keys E(K(t)0, K(t)R) are decrypted to obtain a renewal root key K(t)R.

Thus, the devices DV0, DV1, and DV2 can obtain a renewal root key K(t)R. It should be noted that "Index" in FIG. 3A indicates the absolute addresses of the node keys and leaf keys for use as renewal keys.

If the renewal of node key K(t)0 and root key K(t)R in the upper portion of the tree structure shown in FIG. 2 need not be renewed and only node key K00 needs to be renewed, use of the EKB shown in FIG. 3B allows the distribution of the renewal node key K(t)00 to the devices DV0, DV1, and DV2.

The EKB shown in FIG. 3B can be used to a new content key to be shared in a particular group for example.

To be more specific, assume that the devices DV0, DV1, DV2, and DV3 in a group defined by dashed lines in FIG. 2 use certain recording media and need a new common content key. At this time, data E(K(t)00, CK(t)) obtained by encrypting a new common renewal content key CK(t) by K(t)00 renewing the node key K00 common to the devices DV0, DV1, DV2, and DV3 are distributed along with the EKB shown in FIG. 3B.

This allows the distribution of the data which are not decrypted by any device in another group, for example the device DV4.

Namely, the devices DV0, DV1, and DV2 can obtain a content key CK(t) at time point t by decrypting the above-mentioned ciphertext by use of K(t)00 obtained by processing the EKB.

As described above, the key structure is a tree structure and each key can be renewed as desired by use of an EKB as with the above-mentioned example.

Use of this key structure facilitates the renewal of root key KR and node keys in accordance with various situations, allowing the flexible execution of content distribution in an authorized manner.

FIG. 4 shows an exemplary format of an EKB.

The number of nodes keys is represented by 4 bytes.

The depth of each node key is represented by 4 bytes. This indicates the number of layers in a hierarchical tree for a device to which an EKB is distributed.

The version of EKB is represented by 4 bytes. It should be noted that the version has a capability of identifying the most recent EKB and indicating the relationship with content.

"Reserved" indicates a reserved area.

One or more encrypted node keys which provide the actual contents of EKB are indicated in an area consisting of 16×M bytes from offset address byte 16. Namely, these node keys are encrypted keys as described with reference to FIGS. 3A and 3B.

Further, an encrypted EKB version and an electronic signature are indicated. The electronic signature is executed by the entity which has issued the enabling key block EKB, for example the key management center, the content provider, or the settlement institution. The device which has received the EKB confirms, by signature verification, that the received enabling key block EKB has been issued by an authorized EKB issuing entity.

2. System Configuration

Figure 5:
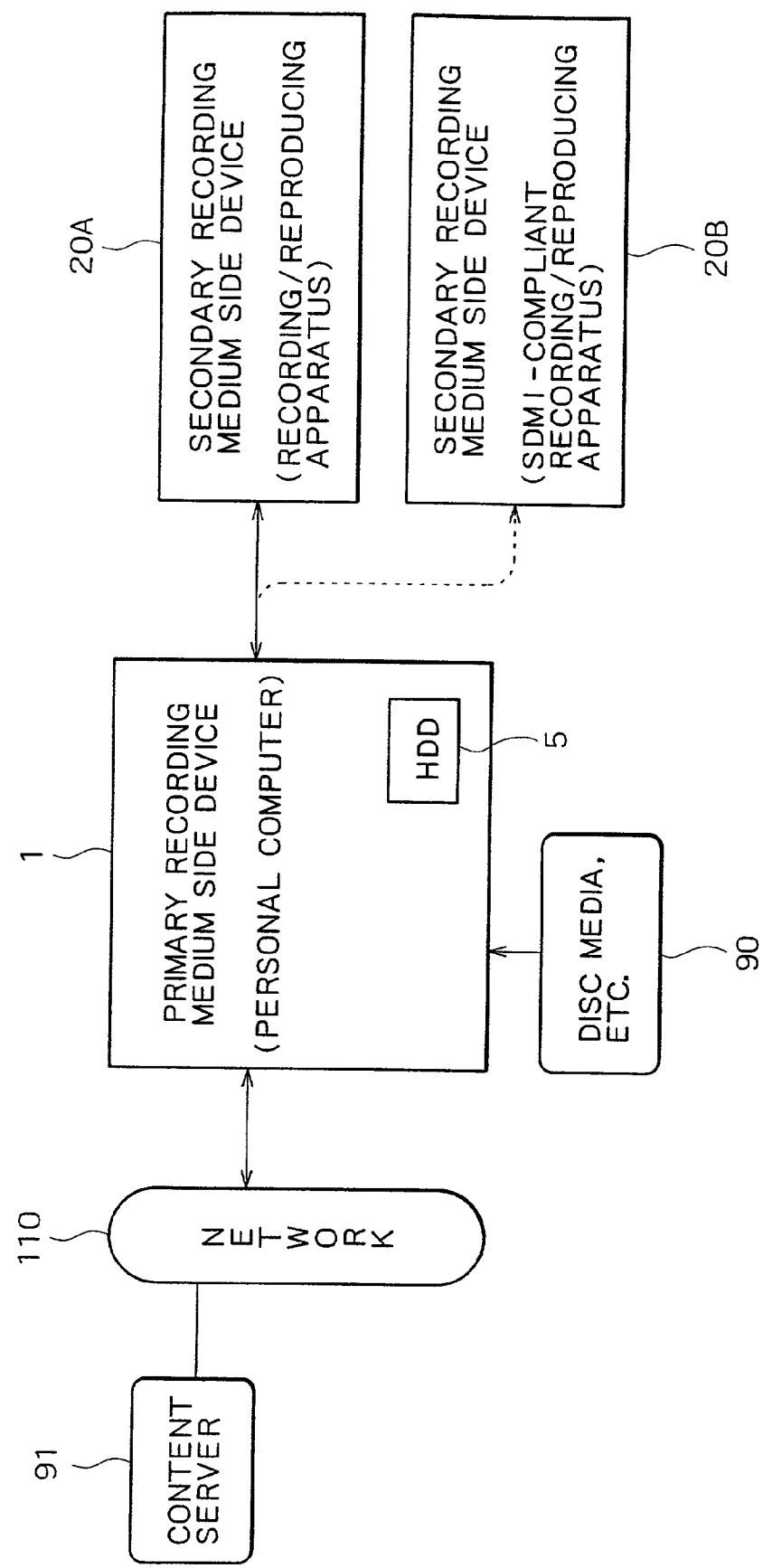
FIG. 5 is a block diagram illustrating an entire system according to the present invention.

The following describes one embodiment of the invention in which the above-mentioned key structure is used. FIG. 5 shows an exemplary system configuration. A primary recording medium side device 1 corresponds to the data transfer apparatus associated with the invention. A secondary recording medium side device 20A corresponds to the data recording apparatus associated with the invention. Therefore, referring to FIG. 2, the configurations of the primary recording medium side device 1 and the secondary recording medium side device 20A correspond to the data transfer system associated with the invention.

The primary recording medium side device 1 is constituted by a personal computer for example. In what follows, the primary recording medium side device 1 is sometimes represented by a personal computer 1 for the convenience of description. However, the primary recording medium side device 1 is not always constituted by a personal computer.

The primary recording medium side device 1 executes the operation as the data transfer apparatus as referred to in the present invention by use of software for executing the storage/transfer for example of SDMI content data, the software being activated on the personal computer.

A HDD 5 which is incorporated in or externally attached to the personal computer 1 is a primary recording medium (and primary recording medium drive means). It should be noted that, in the present embodiment, the HDD 5 is the primary recording medium as described above; however, the primary recording medium is not limited to the HDD, namely the primary recording medium may be disc media such as optical disc and magneto-optical disc, a semiconductor memory incorporated in a device, or a portable semiconductor memory (a memory card, etc.) for example.

The primary recording medium side device 1 is communicable with a content server 91 via a communication network 110. This allows the downloading of content data such as music data for example. Obviously, there are two or more content servers 91, from which the user of the personal computer 1 can use desired various data download services.

The content data which are downloaded from the content server 91 to the personal computer 1 may include both content data compliant with the SDMI standard and not compliant therewith.

The transmission paths constituting the network 110 may be wired or wireless public line networks or a dedicated line arranged between the personal computer 1 and the content server 91. To be more specific, the network 110 may be the Internet, a satellite communication network, an optical fiber network, or any other communication networks.

The HDD 5 of the personal computer 1 can store the content data such as music reproduced from a package medium 90 (hereafter also referred to as a disc 90) such as CD-DA and DVD by an incorporated or externally attached disc drive unit.

The secondary recording medium side device 20A or 20B is connected to the personal computer 1. To the connected secondary recording medium side device 20A or 20B, the content data stored in the HDD 5 can be transferred. The secondary recording medium side device 20A or 20B is a recording apparatus (or a recording/reproducing apparatus) for the secondary recording medium and can copy the content data transferred from the personal computer 1 onto the secondary recording medium for recording.

The secondary recording medium side device 20A or 20B may be embodied in a variety of apparatuses. The secondary recording medium side device 20B as used herein is a recording apparatus compliant with SDMI. The SDMI-compliant recording apparatus will be described later in the description of data path with reference to FIG. 6. For this SDMI-compliant recording/reproducing apparatus 20B, an SDMI-compliant memory card based on a semiconductor memory such as flash memory for example is assumed as the secondary recording medium. Therefore, the secondary recording medium side device 20B is a recording/reproducing apparatus for SDMI-compliant memory cards for example. In this case, the secondary recording medium records SDMI content in an encrypted state.

On the other hand, the secondary recording medium side device 20A corresponds to the data recording apparatus as referred to in the present embodiment and records onto a secondary recording medium the SDMI content whose copyright should be protected in a decrypted state. The secondary recording medium as used here is a MiniDisc for example. Therefore, the secondary recording medium side device 20A is a MiniDisc recording/reproducing apparatus. In what follows, the secondary recording medium side device 20A may be represented as a recording/reproducing apparatus 20A.

It should be noted that, in addition to a MiniDisc, the media which is recorded/reproduced by the secondary recording medium side device 20A may include a memory card based on a semiconductor memory such as flash memory, a MiniDisc as a magneto-optical disc, CD-R (CD Recordable), CD-RW (CD Rewritable), DVD-RAM, DVD-R, and DVD-RW. Therefore, the secondary recording medium side device 20A may be any recording apparatus that is compatible with these media.

The personal computer 1 is connected to the secondary recording medium side device 20A or 20B by a transmission standard such as USB (Universal Serial Bus) or IEEE1394. Obviously, content data and others may be transmitted by a wired or a wireless transmission route based on other transmission standards.

3. Data Path of SDMI Content

Figure 6:
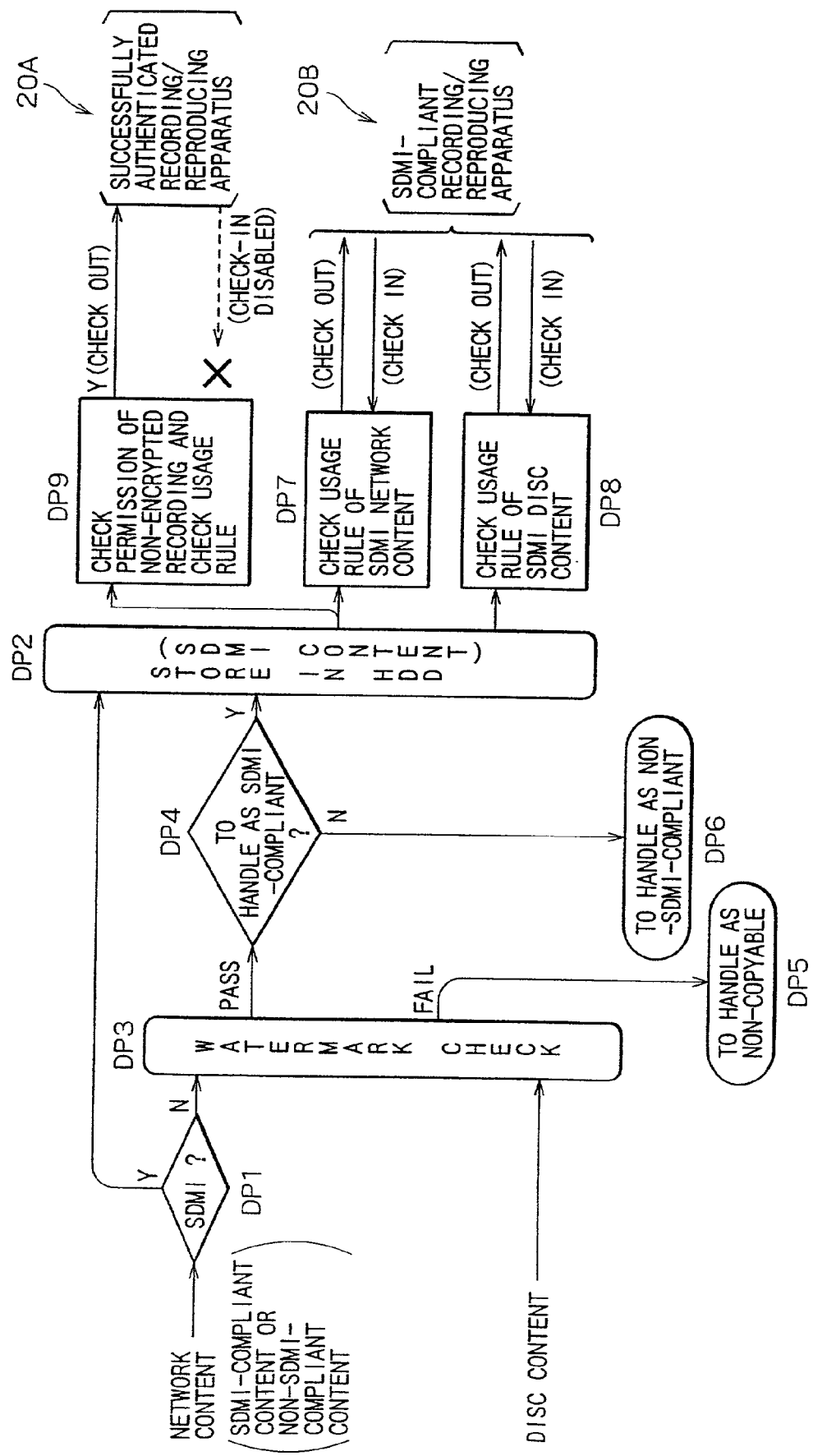
FIG. 6 is a flowchart describing a procedure to be executed when transferring data to secondary recording media via the HDD, which is the primary recording medium.

If the system shown in FIG. 5 for example is assumed, data path define by SDMI are as shown in FIG. 6.

It should be noted that this data path is for the storage of music content and the transfer thereof to external devices (the secondary recording medium side devices 20A and 20B) in the personal computer 1 having the HDD 5 as the primary recording medium. In other words, this path is implemented by the software which executes music content storage/transfer processing in the personal computer 1. The steps/processing along the data path in FIG. 6 are denoted by DP1 through DP9 and, in what follows, corresponding portions are indicated by these codes.

The content data (network content) distributed from the content server 91 via the network 110 shown in FIG. 5 are checked whether they are SDMI-compliant content whose copyright is protected or not (DP1).

The distributed network content includes content which is distributed from a server as SDMI-compliant (hereafter referred to as SDMI-compliant content) and content which is not compliant with SDMI (hereafter referred to as non-SDMI-compliant content).

In the case of SDMI-compliant content, its data are encrypted by content key CK based on key cryptography such as DES for example. If the content data themselves are data (A3D) originally encoded by a data compression algorithm such as ATRAC3, then the SDMI-compliant content is distributed in a state of E(CK, A3D).

If the distributed network content is SDMI-compliant content, it is stored in the HDD 5, the primary recording medium, as the SDMI content (DP1→DP2).

In this case, the content data are written to the HDD 5 in a state of distributed E(CK, A3D). Alternatively, the content data may be written to the HDD 5 in a state of E(CK', A3D) obtained by decrypting the content and encrypted again by another key CK', namely by replacing the keys.

On the other hand, if network content is non-SDMI-compliant content, watermark check, or the screening processing by electronic watermark is performed on the received content (DP1→DP3).

Further, disc content read from a package medium such as CD-DA or DVD reproduced by an incorporated drive such as CD-ROM drive mounted on the personal computer 1 or a disc drive unit connected to the personal computer 1 is directly subject to watermark checking (DP3).

Namely, watermark checking is performed on the content data not compliant with SDMI.

If the content has not passed the watermark check, this content is handled as non-copyable on the SDMI data path (DP3→DP5). Specific handling operations depend on the software design of the system. For example, the non-copyable content may be handled as content which can be stored in the HDD 5 for example but cannot be transferred to other media for copy/move operation. Alternatively, the non-copyable content may be handled not to be stored in the HDD 5 in the processing of SDMI-compliant content.

If the content has passed the watermark check, namely if an electronic watermark is found and copy is permitted in a control bit, it indicates that the content data can be copied in an authorized manner. Then, it is determined whether these content data are to be handled as SDMI-compliant (DP4). This determination is made on the basis of the software design or user settings.

If these content data are not to be handled as SDMI-compliant, then these content data are handled as non-SDMI-compliant and are excluded from the SDMI-compliant data path (DP6). For example, these content data may be transferred to a recording apparatus not compliant with SDMI.

On the other hand, if these content data are to be handled as SDMI-compliant, then these content data are encrypted and the encrypted data are stored in the HDD 5 as SDMI-compliant content (DP4→DP2). For example, these data are stored in the HDD 5 in a state of E(CK, A3D) or E(CK', A3D).

Along the above-mentioned data path, the content handled as SDMI-compliant (SDMI network content) provided through the network 110 and the content handled as SDMI-compliant (SDMI disc content) retrieved from a disc medium such as CD-DA or another medium are stored in the HDD 5, the primary recording medium.

The SDMI content (SDMI network content or SDMI disc content) stored in the HDD 5 can be transferred to the SDMI-compliant recording/reproducing apparatus 20B to be copied onto an SDMI-compliant secondary recording medium under predetermined rules. In the present embodiment, the SDMI content can be transferred to the recording/reproducing apparatus 20A under predetermined conditions, in addition to the SDMI-compliant recording/reproducing apparatus 20B.

If the SDMI-compliant recording/reproducing apparatus 20B is connected to the personal computer 1 having the HDD 5, the following data path takes place.

In the case of SDMI disc content, SDMI disc content is permitted by a transfer handling rule (usage rule) for SDMI disc content for transfer to the SDMI-compliant recording/reproducing apparatus 20B for copying (DP8).

It should be noted that the transfer for copy from the primary recording medium (the HDD 5) to a secondary recording medium (a memory card for example) which is recorded/reproduced on the SDMI-compliant recording/reproducing apparatus 20B is referred to as "checkout." Conversely, transfer for move from the secondary recording medium to the primary recording medium is referred to as "check-in." In the cases of move from the secondary recording medium to the primary recording medium, the moved content data are deleted from the secondary recording medium.

The usage rule for SDMI disc content specifies a predetermined upper limit of the number of times one piece of content data can be checked out; three times for example. Therefore, the copying to a maximum of three SDMI-compliant secondary recording media may be permitted. In the case of check-in, the checkout count allocated to the content data is decremented. Consequently, if one piece of content data has been copied to three SDMI-compliant secondary recording media for example and one of these media performs a check-in, this content data becomes copyable once more to an SDMI-compliant secondary recording medium. Namely, the usage rule allows SDMI content data to always exist on a maximum of three SDMI-compliant recording media.

A transfer handling rule (usage rule) is also specified for SDMI network content. Under this usage rule, the transfer of SDMI network content is permitted for transfer to the SDMI-compliant recording/reproducing apparatus 20B for copying (DP7).

Like the usage rule for SDMI disc content, the usage rule for SDMI network content specifies a predetermined upper limit for the number of times one piece of SDMI network content can be checked out. This upper limit of checkout count may be the same as or different from that of SDMI disc content. For example, the upper limit for checkout count may be set to one. In this case, one piece of content data can be copied only to one SDMI-compliant secondary recording medium; however, if the copied content data are checked in from this secondary recording medium, the content data may be transferred for copying once more.

When SDMI content is transferred to an SDMI-compliant secondary recording medium under these usage rules, the data transmission is performed on the transmission route in an encrypted state. Namely, the SDMI content is transferred in a state of E(CK, A3D) or E(CK', A3D) for example.

The SDMI-compliant recording/reproducing apparatus 20B which has received the encrypted SDMI content copies it to a secondary recording medium as encrypted.

When the SDMI-compliant recording/reproducing apparatus 20B reproduces the SDMI content copied to the secondary recording medium, the SDMI-compliant recording/reproducing apparatus 20B decrypts the content data read from the secondary recording medium before reproduction. Namely, the SDMI-compliant recording/reproducing apparatus 20B decrypts the content data recorded to the secondary recording medium in the state of E(CK, A3D) or E(CK', A3D) by use of key CK or key CK'.

Consequently, the content data are decrypted as D{CK, E(CK, A3D)}=A3D or D{CK', E(CK', A3D)}=A3D into the original content data as ATRAC3 data (A3D). The decrypted content data are decompressed from ATRAC3 compression for example and the decompressed content data are demodulated as audio data for example to reproduce music.

As described above, SDMI-compliant content data are kept encrypted on the data path until they are checked out by the SDMI-compliant recording/reproducing apparatus 20B and up to the secondary recording medium and the copying of these data is managed by the usage rules, thereby providing the proper copyright protection of these content data.

On the other hand, if the recording/reproducing apparatus 20A is connected to the personal computer 1, the following processing is performed.

It should be noted that, as described above, unlike the SDMI-compliant recording/reproducing apparatus 20B, the recording/reproducing apparatus 20A records content data to a secondary recording medium such as a MiniDisc in a decrypted state. The recording in a decrypted state makes it practicable to reproduce content data copied to a MiniDisc with a general, commercially available MiniDisc reproducing apparatus, thereby enhancing user convenience.

However, the recording in a decrypted state may cause problems in copyright protection. In order to prevent these problems from happening, the transfer of content data to the recording/reproducing apparatus 20A must satisfy predetermined conditions.

These conditions for permitting the transfer of SDMI network content to the recording/reproducing apparatus 20A and the copying of the transferred content data to a secondary recording medium in a decrypted state include: $\hat{1}$ the recording/reproducing apparatus 20A has been successfully authenticated; $\hat{2}$ the copying and recording of the content data to be transferred have been permitted by the copyright holder side; and $\hat{3}$ the usage rules that check-in is prohibited and a checkout count is specified are satisfied, for example.

When the above-mentioned conditions $\hat{1}$, $\hat{2}$, and $\hat{3}$ are satisfied, content data cannot be absolutely transferred for copying also to any devices other than the SDMI-compliant recording/reproducing apparatus 20B, thereby providing a copyright protection capability. This capability can also be provided by putting content data in an encrypted state along the transmission route of transfer (in this case, the encrypted content data are decrypted by the recording/reproducing apparatus 20A.

When SDMI network content is transferred to the recording/reproducing apparatus 20A, the above-mentioned transfer conditions $\hat{1}$, $\hat{2}$, and $\hat{3}$ are checked (DP9). To be more specific, a predetermined authentication process is executed on the recording/reproducing apparatus 20A. Further, by the flag information for example included in content data, the intention of a copyright holder for permitting copy can be checked. In addition, the usage rules for check-in and checkout are applied.

If SDMI network content is transferred to the recording/reproducing apparatus 20A under these conditions, the content data are transmitted along the transmission route in an encrypted state. Namely, the content data are transmitted in the above-mentioned state of E(CK, A3D) or E(CK', A3D).

The encrypted SDMI network content is received by the recording/reproducing apparatus 20A having a configuration shown in FIG. 8 described later, and decrypted by a decryption processing block 31 into the original ATRAC3 compressed data (A3D). Then, the decrypted content data are supplied to a recording/reproducing block 25 through the encoding by an encoding/decoding block 24 to be copied to a MiniDisc 100.

Therefore, when the recording/reproducing apparatus 20A reproduces the copied SDMI content from the MiniDisc 100, the recording/reproducing apparatus 20A may perform on the data read from the MiniDisc 100 the normal MiniDisc system decoding; namely, EFM demodulation, ACIRC error correction, and decompression for ATRAC compression.

This denotes that, if the MiniDisc 100 copied with content data is loaded on a normal MiniDisc reproducing apparatus, the content data can be normally reproduced therefrom. Namely, as described above, the user can reproduce the SDMI network content copied to the MiniDisc 100 by a normal non-SDMI-compliant MiniDisc reproducing apparatus to enjoy music for example.

It should be noted that, in the data path shown in FIG. 6, if the transfer is not permitted by checking the usage rules in steps DP7, DP8, and DP9, the content data are not transmitted to the recording/reproducing apparatus 20A or 20B.

It should be noted that, although the check-in processing from the recording/reproducing apparatus 20A is disabled in step DP9, this check-in processing may be allowed by performing deletion processing or deletion processing by U-TOC editing on the side of the recording/reproducing apparatus.

4. Exemplary Configuration of Data Transfer Apparatus (Device on the Primary Recording Medium Side: PC)

Figure 7:
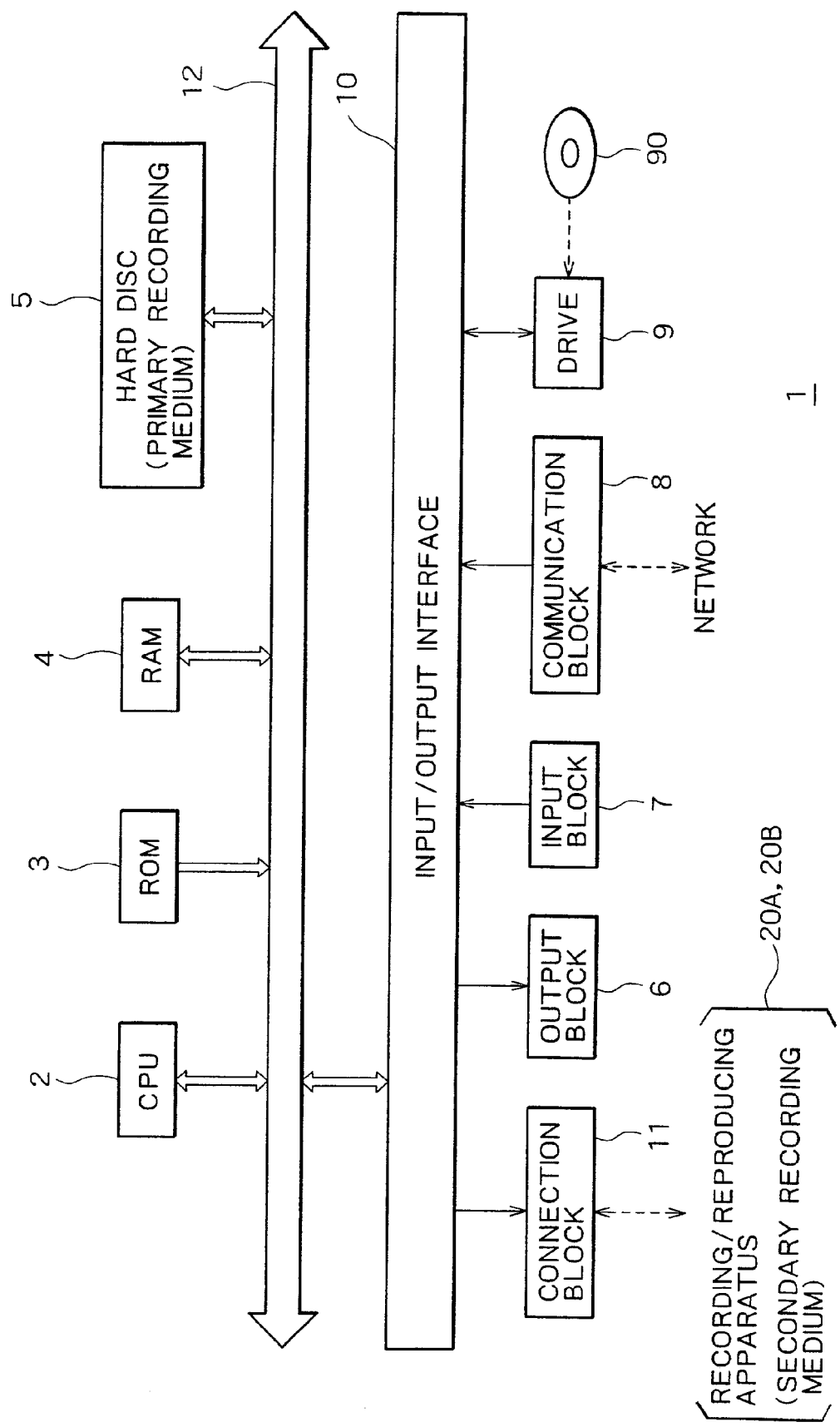
FIG. 7 is a block diagram illustrating a primary recording medium side device.

Referring to FIG. 7, there is shown an exemplary configuration of the primary recording medium side device 1 which serves as the data transfer apparatus. In the following example, the primary recording medium side device 1 is constituted by a personal computer. It will be apparent that the primary recording medium side device 1 may be formed as a device dedicated to data transfer by building a configuration having the same functionality as above by dedicated hardware.

In this example, the primary recording medium side device 1 providing the data transfer apparatus is realized by installing a software program which causes the personal computer 1 to execute the functionality as the data transfer apparatus. It should be noted that the term "personal computer" or "computer" as used herein denotes a so-called general-purpose computer.

The above-mentioned program may be stored in the hard disc drive (HDD) 5 or a ROM 3 incorporated in the computer as a storage medium. Alternatively, the above-mentioned program may be temporarily or permanently stored in a removal recording medium 90 such as floppy disc, CD-ROM (Compact Disc Read Only Memory), MO (Magneto Optical) disc, DVD (Digital Versatile Disc), magnetic disc, or semiconductor memory. The removable recording medium 90 may be provided as so-called packaged software.

In addition to being installed from the removable recording medium 90 into the computer, the above-mentioned program may be transferred from a download site via an artificial satellite for digital satellite broadcast to the computer in a wireless manner or via a LAN (Local Area Network) or the Internet in a wired manner and the program received by the computer via a communication block 8 may be installed in the incorporated HDD 5.

The personal computer 1 shown in FIG. 7 incorporates a CPU (Central Processing Unit) 2. The CPU 2 is connected to an input/output interface 10 via a bus 12. When a command is inputted by the user by operating an input block 7 composed of a keyboard, a mouse, and a microphone for example via the input/output interface 10, the CPU 2 executes a program stored in the ROM (Read Only Memory) 3 accordingly. Alternatively, the CPU 2 executes a program stored in the HDD 5, a program supplied from an artificial satellite or a network, received at the communication block 8, and installed in the HDD 5, or a program installed in the HDD 5 from the removal recording medium 90 such as an optical disc loaded on a drive 9. The CPU 2 executes the program by loading it into a RAM (Random Access Memory) 4. Thus, the CPU 2 executes the processing as the data transfer apparatus for SDMI content to be described later.

Then, as required, the CPU 2 outputs the results of the processing from an output block 6 constituted by a LCD (Liquid Crystal Display) or a speaker for example, transmits the results of the processing from the communication block 8, or records the results of the processing to the HDD 5 via the input/output interface 10.

In the present example, the communication block 8 can communicate with various servers via the network 110 shown in FIG. 5. Namely, the computer 1 can download network content such as music content from an external content server 91. The downloaded network content is processed as SDMI-compliant content or non-SDMI-compliant content depending on the above-mentioned data path. At least for example, if network content is handled as SDMI-compliant, it is stored in the HDD 5 as SDMI content. The SDMI content stored in the HDD 5 becomes the content to be transferred to the SDMI-compliant recording/reproducing apparatus 20B or the authenticated secondary recording medium side device (recording/reproducing apparatus) 20A.

A connection block 11 is connected to the secondary recording medium side devices 20A and 20B in a data communication enabled manner. For example, the connection block 11 is based on USB (Universal Serial Bus) interface or IEEE1394 interface. It will be apparent that a wired interface or a wireless interface such as infrared or radio based on other connection standards may also be used.

It should be noted that the processes which realize the data path shown in FIG. 6 need not be processed in a time-series manner; they may be processed in either in parallel or discretely (for example, parallel processing or object processing).

Each program may be processed by one computer or a plurality of computers in a distributed manner. Further, each program may be transferred to a remote computer and executed thereon.

5. Exemplary Configuration of Data Recording Apparatus (Device on the Secondary Recording Medium Side: Recording/Reproducing Apparatus)

Figure 8:
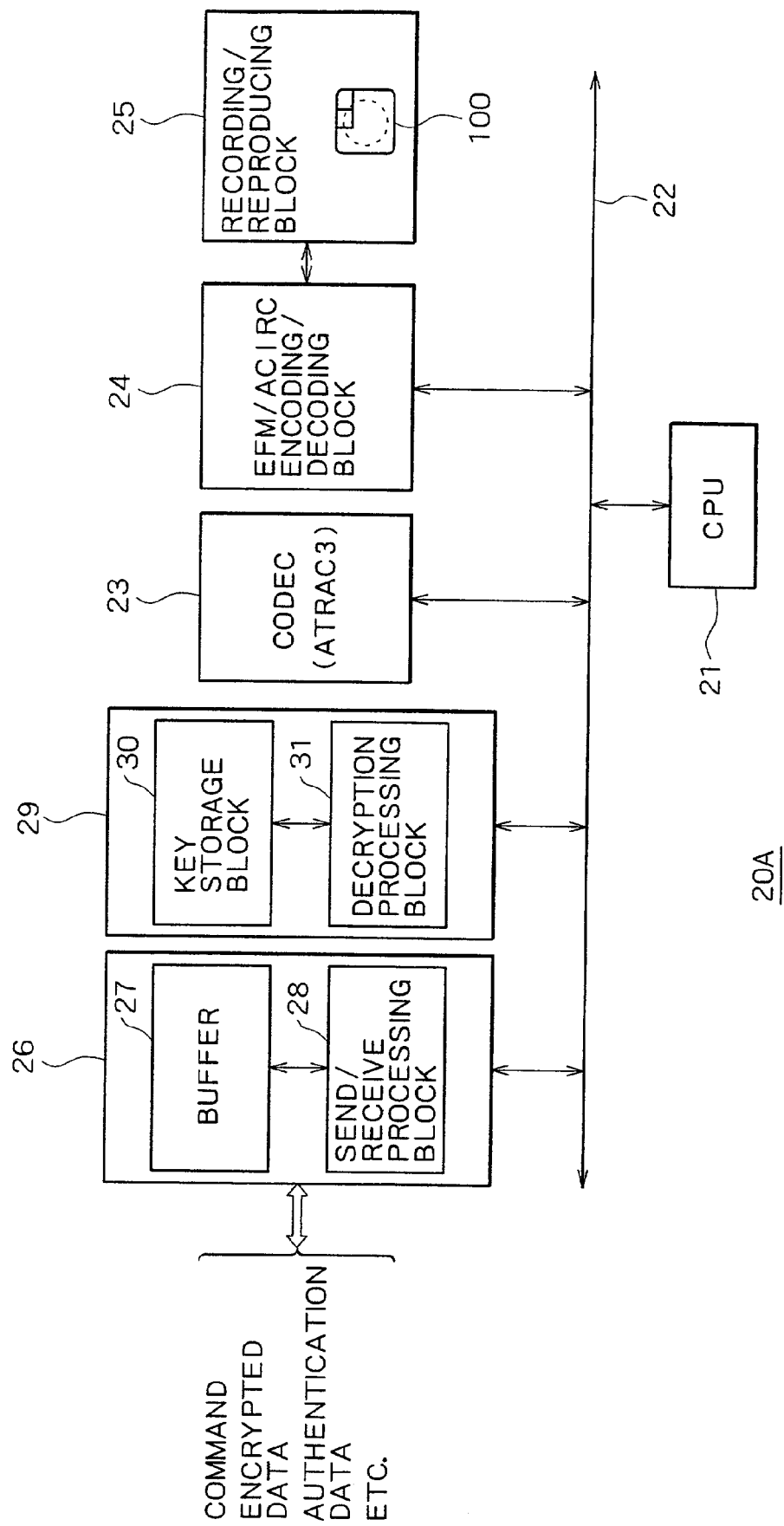
FIG. 8 is a block diagram illustrating one secondary recording medium side device.

Referring to FIG. 8, there is shown an exemplary configuration of the secondary recording medium side device (recording/reproducing apparatus) 20A.

In this example, the recording/reproducing apparatus 20A is constituted by a MiniDisc recording apparatus for example. Therefore, a secondary recording medium 100 is a MiniDisc (magneto-optical disc). In what follows, the secondary recording medium 100 is also referred to as the MiniDisc 100.

It should be noted that FIG. 8 shows only a processing system for processing the recorded/reproduced data with a MiniDisc as the secondary recording medium 100 and a processing system for processing the authentication and data transfer with the above-mentioned primary recording medium side device 1, omitting the details of driving system, servo system, and reproducing and outputting system for example for the MiniDisc 100 because these systems are the same as those of an ordinary MiniDisc recording/reproducing apparatus.

A CPU 21 is a controller for controlling the entire recording/reproducing apparatus 20A. To be more specific, in order to record and reproduce content data on the MiniDisc 100, the CPU 21 performs the control of rotational driving, spindle servo, focus servo, tracking servo, and sled servo, the control of laser beam and magnetic field applying operations of an optical head/magnetic head, and the control of encoding/decoding of recorded/reproduced data, for example. In addition, the CPU 21 performs the instructions for communication and the generation of data necessary for the authentication with the personal computer 1, the control of transactions of various commands with the personal computer 1, and the control of the processing of transferred content data.

Although not shown, an operation block and a display block are arranged as user interface. The CPU 21 also performs the monitoring of user operations done through the operation block, the processing responsive to user operations, and the control of the display operations of the display block.

A recording/reproducing block 25 has an optical head, a magnetic head, a disc rotational driving system, a servo system for example and actually records/reproduces data on the MiniDisc 100.

An EFM/ACIRC encoding/decoding block 24 encodes the data to be recorded on the MiniDisc 100 and decodes the data reproduced from the MiniDisc 100. As is known, in the case of a MiniDisc system, the data to be recorded are subjected to ACIRC (Advanced Cross Interleave Read Solomon Coding) error correction code encoding processing and EFM processing. Therefore, the encoding/decoding block 24 performs ACIRC encoding and EFM (Eight to Fourteen Modulation) encoding on the data to be recorded and supplies the encoded data to the recording/reproducing block 25.

At reproduction, the encoding/decoding block 24 performs decoding processes such as binarization, EFM demodulation, and ACIRC error correction on the data (RF signal) supplied from the recording/reproducing block 25.

A codec 23 performs data compression and decompression processing based on ATRAC/ATRAC3 compression scheme.

The data to be recorded on the MiniDisc 100 are compressed by ATRAC or ATRAC3 and then encoded as described above. Therefore, if data not compressed, PCM audio data for example, are inputted in the recording/reproducing apparatus 20A as the data to be recorded, the data are compressed by the codec 23 on the basis of ATRAC/ATRAC3, the compressed data being supplied to the EFM/ACIRC encoding/decoding block 24.

At reproduction, the data read by the recording/reproducing block 25 and decoded by the encoding/decoding block 24 are the data compressed by ATRAC/ATRAC3. Therefore, the codec 23 decompresses the compressed data based on ATRAC/ATRAC3 to demodulate digital audio data of 44.1 KHz and 16-bit quantization for example. The demodulated digital audio data are supplied to an output circuit, not shown, to undergo D/A conversion, analog signal processing, and amplification for example. The resultant data provide a speaker output signal which is reproduced as music for example. Alternatively, the digital audio data may be outputted without change to another device.

The above-mentioned configuration is also provided in the recording/reproducing apparatus of an ordinary Mini-Disc system. In the recording/reproducing apparatus 20A, an interface block 26 and a decryption block 29 are arranged as portions corresponding to a personal computer serving as the primary recording medium side device 1.

The interface block 26 is connected to the connection block 11 of the personal computer 1 shown in FIG. 7 to perform data communication with the personal computer 1. Hence, the interface block 26 has a buffer block 27 for buffering send/receive data and a send/receive processing block 28 for processing signals on the interface. For example, the send/receive processing block 28 processes signals based on the USB or IEEE1394 standard.

The communication with the personal computer 1 via the interface block 26 includes the reception of various commands from the personal computer 1, the sending/receiving of the data for authentication processing to be described later, and the reception of SDMI content.

The decryption block 29, which is a functional block corresponding to SDMI content encryption processing, has a key storage block 30 and the above-mentioned decryption processing block 31.

The key storage block 30 stores key information necessary for decrypting encrypted SDMI content.

Because SDMI content is encrypted by content key CK or CK', the key information makes at least content key CK or CK' recognized. To be specific, the DNK (Device Node Key) described with reference to FIG. 2 is stored as the key information. This recording/reproducing apparatus 20B corresponds to one device (DVx) shown in FIG. 2, so that the leaf key and the node keys encrypted by the leaf key and the root key are stored in the DNK. By use of this DNK or, sometimes, the supplied EKB, the content key CK can be recognized.

Because the DNK which is the information making the content key CK recognized for SDMI content is stored, the decryption processing block 31 can decrypt the SDMI content supplied as encrypted by the content key CK, namely the content in a state of E(CK, A3D) for example. Namely, the decrypted data compressed by ATRAC3 can be obtained as D{CD, E(CK, A3D)}=A3D. The ATRAC3—compressed data thus decrypted are encoded by the EFM/ACIRC encoding/decoding block 24 to be recorded to the MiniDisc 100 by the recording/reproducing block 25.

It should be noted that, with SDMI content, its ATRAC3-compressed data are not always encrypted. For example, linear PCM data which are encrypted by the key CK are possible. Namely, content in a state of E(CK, PCM) for example may be inputted. Obviously, in such a case, decrypted linear PCM data decrypted by the decryption processing block are obtained as D{CK, E(CK, PCM)}=PCM. In this case, these PCM data are ATRAC3-compressed by the codec 23, encoded by the EFM/ACIRC encoding/decoding block 24, and recorded to the MiniDisc 100 by the recording/reproducing block 25.

The key storage block 30 may also store keys necessary for authentication processing. In an example of authentication processing to be described later, a public key P and a secret key S stored in the recording/reproducing apparatus 20A are used. In this case, both public key P and secret key S are stored in the key storage block 30.

6. Authentication Processing

The recording/reproducing apparatus 20A which records content data in a decrypted state to a MiniDisc must be successfully authenticated by the personal computer 1 as one of the transfer/recording conditions. Authentication is the processing in which the validity of the recording/reproducing apparatus 20A which is permitted to record content data in a non-encrypted state is checked.

This authentication processing is executed when a recording/reproducing apparatus other than the SDMI-compliant recording/reproducing apparatus 20B is connected to the connection block 11 of the personal computer 1. If the SDMI-compliant recording/reproducing apparatus 20B is connected, it is checked if this apparatus is the SDMI-compliant recording/reproducing apparatus 20B as referred to herein. Namely, if the connected device is found not the SDMI-compliant recording/reproducing apparatus 20B, the authentication processing described below is executed to check whether or not the connected device is the recording/reproducing apparatus 20A.

The authentication processing in the present example is based on asymmetric cryptography (public key cryptography). In asymmetric cryptography, an encryption key and a decryption key are different from each other. Now, let data before encryption be Db, an encryption key be Ke, and a decryption key be Kd, then encrypted data C are encrypted as C=E(Ke, Db) and decrypted as D(Kd, C)=Db.

Encryption key Ke and decryption key Kd are called a key pair, one being made public as a public key and the other being held in predetermined block as a secret key.

In the authentication processing described below, the public key of the key pair Ke and Kd is represented by P and the secret key is represented by S. As described above, the recording/reproducing apparatus 20A stores public key P and secret key S providing encryption key Ke and decryption key Kd in the key storage block 30.

Figure 9:
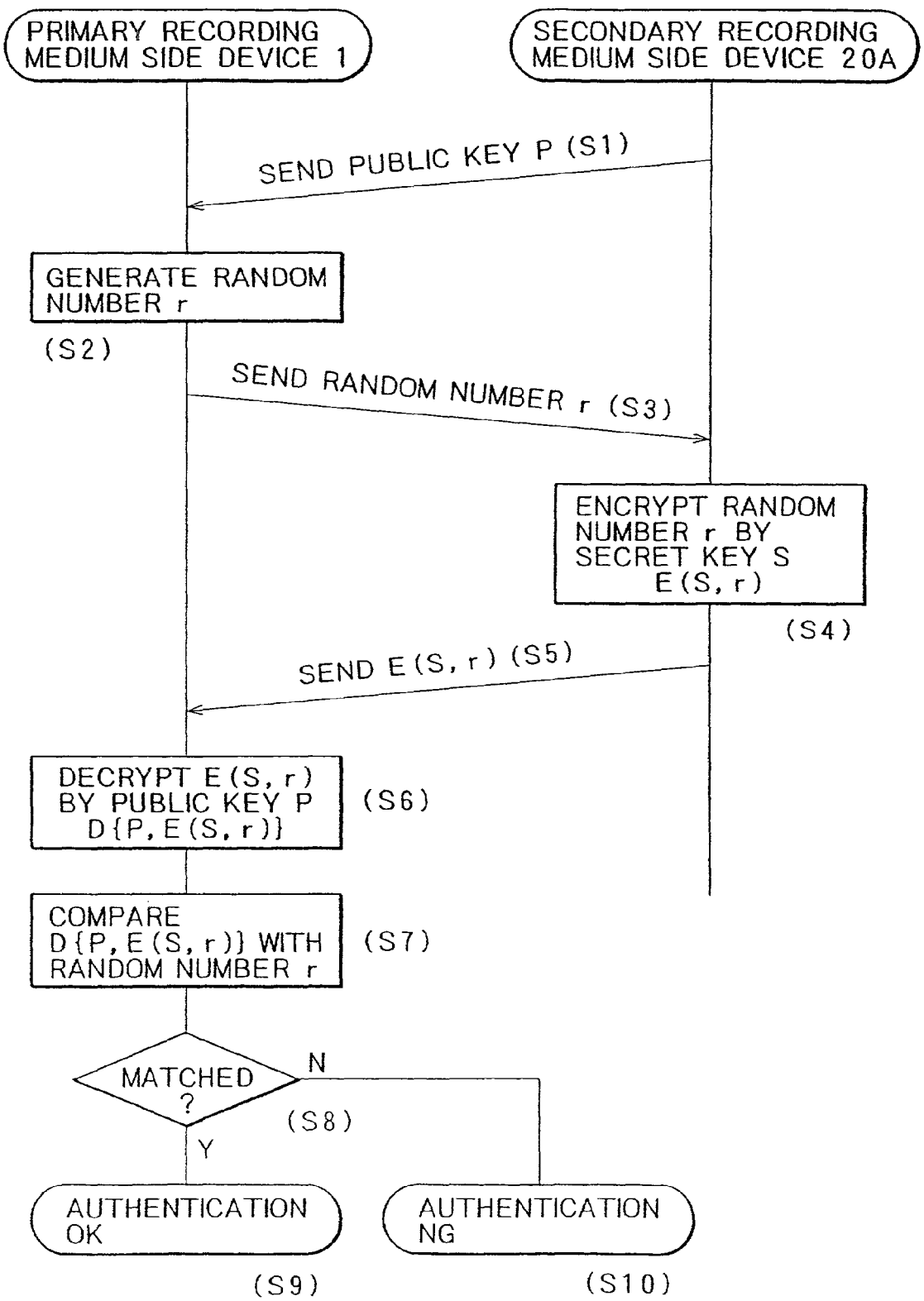
FIG. 9 is a flowchart describing authentication processing to be executed between the primary recording medium side device and the secondary recording medium side device.

In the authentication processing, the CPU 2 of the primary recording medium side device (personal computer) 1 sends an authentication request command to the CPU 21 of the secondary recording medium side device (recording/reproducing apparatus) 20A. Then, the processing as shown in FIG. 9 is executed between the CPU 2 (the primary recording medium side device (personal computer) 1 and the CPU 21 (the secondary recording medium side device (recording/reproducing apparatus) 20A.

When the authentication processing starts, the CPU 21 of the secondary recording medium side device 20A sends a public key P stored in the key storage block 30 from the interface block 26 to the primary recording medium side device 1 in step S1. It should be noted that the public key P is also known to the primary recording medium side device 1.

Receiving the public key P, the CPU 2 of the primary recording medium side device 1 generates random number r in step S2. In step S3, the CPU 2 sends the generated random number r to the secondary recording medium side device 20A.

Next, in step S4, the CPU 21 of the secondary recording medium side device 20A encrypts the received random number r by use of a secret key S stored in the key storage block 30. In step S5, the CPU 21 sends encrypted data E(S, r) to the primary recording medium side device 1.

Receiving encrypted data E(S, r), the CPU 2 of the primary recording medium side device 1 decrypts received encrypted data E(S, r) by use of the public key P in step S6. Namely, the CPU 2 performs the processing of D{P, E(S, r)}. Then, in step S7, the CPU 2 compares the random number r generated in step S2 with decryption result D{P, E(S, r)} obtained in step S6.

If the public key P and secret key S are the proper key pair, r=D{P, E(S, r)} should be obtained.

If a match is found, it indicates that the secondary recording medium side device 20A holds the secret key for the public key P, so that the process goes from step S8 to step S9, thereby authenticating the secondary recording medium side device 20A as a valid connection mate.

On the other hand, if a mismatch is found, the process goes from step S8 to step S10, in which it is determined the connected secondary recording medium side device is not a valid connection mate (namely, a device to which SDMI content can be transferred), thereby failing authentication.

For example, if the connection device is authenticated by the above-mentioned authentication processing to be the secondary recording medium side device 20A, then the primary recording medium side device 1 recognizes that one of conditions for permitting the transfer of SDMI content to that connected device.

7. Content Encryption Scheme

In the system of the present embodiment, the devices shown at the bottom in the tree structure shown in FIG. 2 are the recording/reproducing apparatuses 20A and 20B. The following describes an example in which the encryption structure as shown in FIG. 2 is realized in the present system.

Figure 10:
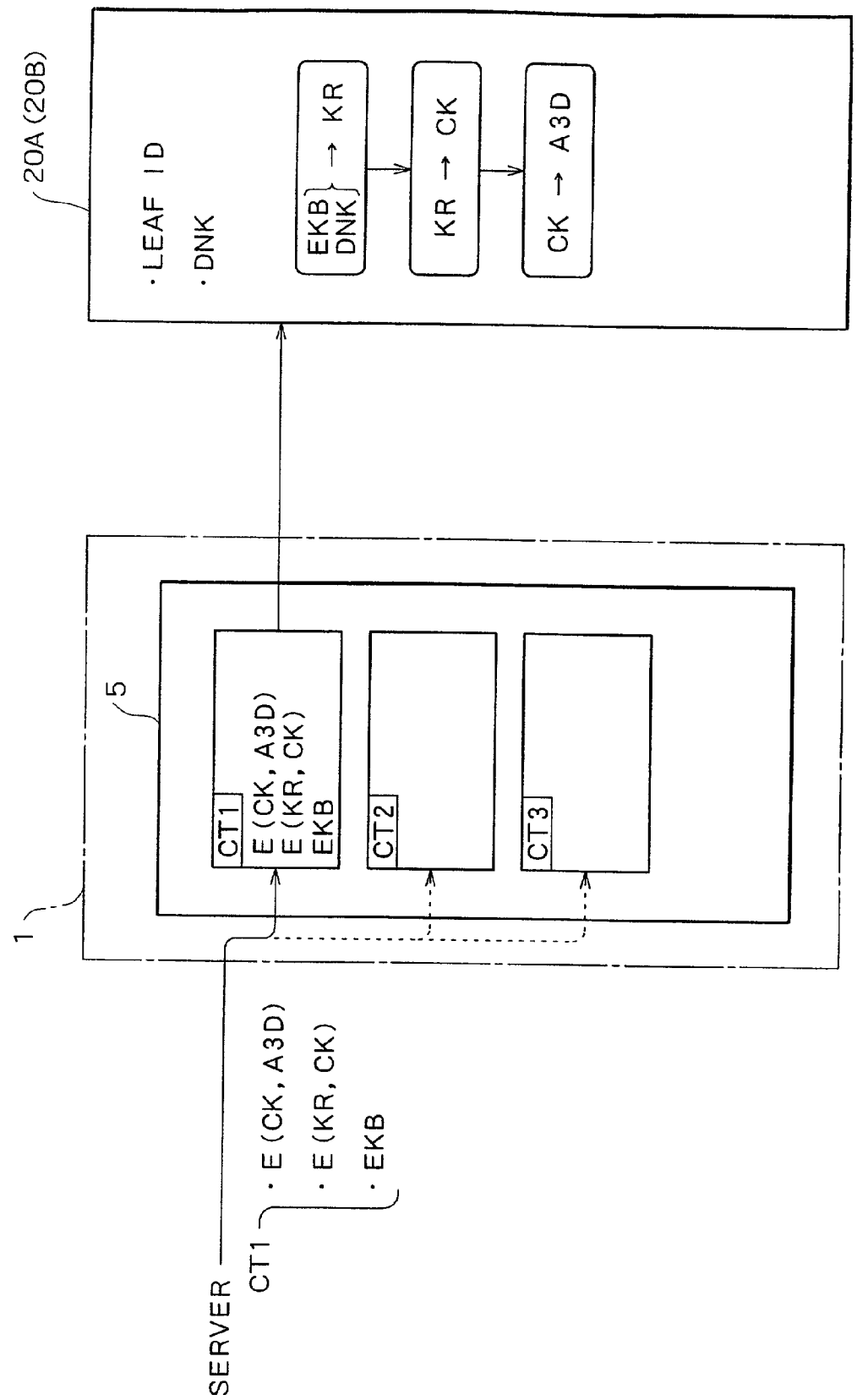
FIG. 10 illustrates data flows which take place when storing content data and key information distributed from an external server into the HDD of the primary recording medium side device and then transmitting these content data and key information to the secondary recording medium side device.

Referring to FIG. 10, there is shown the processing flows of content data and keys.

If particular content data CT1 are distributed from the external server 91 shown in FIG. 5 to the personal computer 1, E(CK, A3D), E(KR, CK), and EKB are transmitted for this one unit of content data CT1 to be stored in the HDD 5.

E(CK, A3D) represents ATRAC3-compressed content data encrypted by the content key CK, providing the actual information such as music, which is the purpose of the distribution.

E(KR, CK) represents the information obtained by encrypting, by the root key KR described with reference to FIG. 2, the content key CK for decrypting content data.

The EKB is the enabling key block information described with reference to FIGS. 2 through 4 and, in the present embodiment, the information for renewing the root key KR.

In response to the distribution of one piece of content data, the above-mentioned E(CK, A3D), E(KR, CK), and EKB are distributed in a set; consequently, the above-mentioned set and content data CT1, CT2, and so on are stored into the HDD 5 as shown, in correspondence with each piece of content data.

If the personal computer 1 transfers content data to the recording/reproducing apparatus 20A or 20B, the personal computer 1 sends a set of E(CK, A3D), E(KR, CK), and EKB in a procedure to be described later.

In the recording/reproducing apparatuses 20A and 20B corresponding to the devices (terminals) described with reference to FIG. 2, leaf IDs unique to these devices are set and DNKs (Device Node Keys) are stored.

When the content data of the above-mentioned set are supplied from the personal computer 1, the recording/reproducing apparatus decrypts (or does not decrypt) the received content data and stores the resultant content data into a secondary recording medium. In the case of the SDMI-compliant recording/reproducing apparatus 20B, the received content data are decrypted at their reproduction. In the case of the recording/reproducing apparatus 20A, the received content data are decrypted at their recording.

In this decryption processing, the root key KR is first encrypted by use of the stored DNK and the received EKB as shown.

Next, content key CK is decrypted by use of the decrypted root key KR.

Then, by use of the decrypted content key CK, decrypted content data A3D can be obtained.

Figures 11A, 11B:
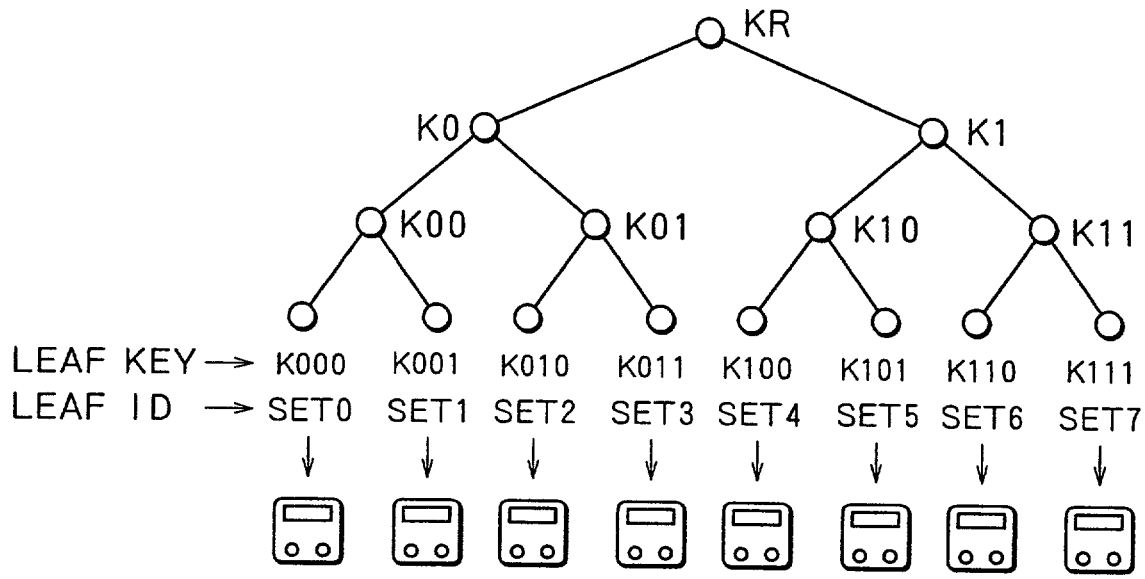
FIG. 11A illustrates a tree structure of encryption keys associated with the invention.
FIG. 11B illustrates a data structure of a device node key (DNK) stored in the secondary recording medium side device.
Figure 12:
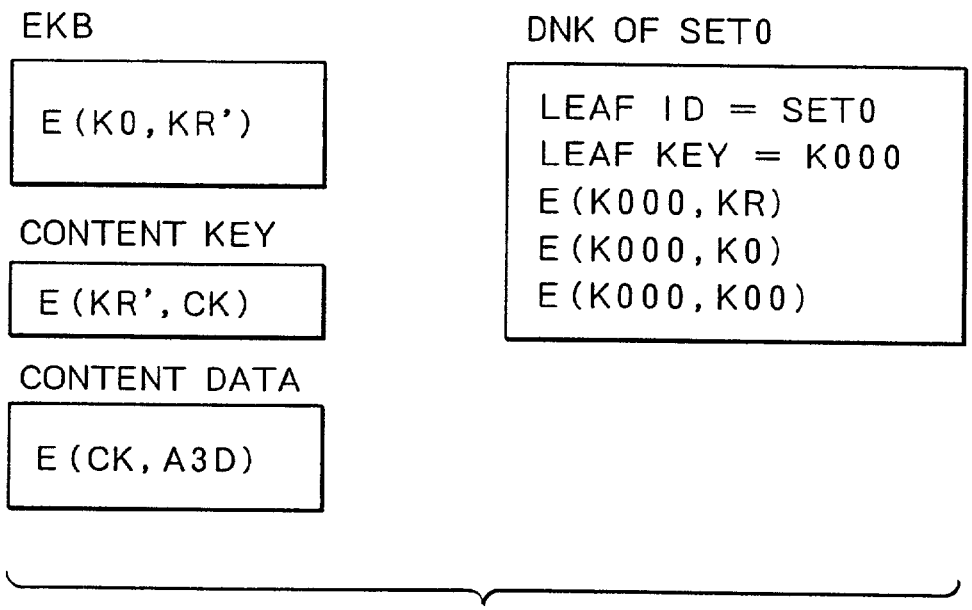
FIG. 12 illustrates a procedure for, if a root key has been changed, decrypting the changed root key by use of a DNK stored in the secondary recording medium side device.

The following specifically describes the DNK and the decryption procedure in the case of the recording/reproducing apparatus 20A with reference to FIGS. 11A, 11B, and 12.

Now, assume a tree structure as shown in FIG. 11A and that leaf ID=SET0 and leaf key=K000 be set to the recording/reproducing apparatus 20A, for example.

In this case, the DNK stored in the recording/reproducing apparatus 20A has information as shown in FIG. 11B.

First, "SET0" is stored as the leaf ID.

Also, "K000" is stored as the leaf key.

Then, the information is stored which indicates the route from the leaf key "K000" to the root key KR in the structure shown in FIG. 11A. Namely, the node keys K00 and K0, and root key KR are stored. It should be noted that these node keys K00 and K0 and root key KR are stored as encrypted by the leaf key K000. Namely,

E(K000, K00)
E(K000, K0)
E(K000, KR)

are stored as shown.

Because the DNK as described above is stored, the recording/reproducing apparatus 20A can decrypt transferred content data E(CK, A3D) by the use of transferred E(KR, CK).

Namely, in this case, the recording/reproducing apparatus 20A can obtain the root key KR by decrypting D{K000, E(K000, KR)} by use of the leaf key K000.

Then, the recording/reproducing apparatus 20A can obtain the content key CK by decrypting D{KR, E(KR, CK)} by use of the decrypted root key KR.

Further, the recording/reproducing apparatus 20A can obtain the decrypted content data A3D by decrypting D{CK, E(CK, A3D)} by use of the decrypted content key CK.

However, the above-mentioned root key KR and node keys are not eternal but are subject to change according to the situation. In the case the system where the content key CK is transferred as encrypted by the root key KR as with the present example, the root key KR may be changed to each piece of content data.

For example, a music provider may change the root key KR for each piece of content data, thereby reinforcing copyright protection. Hence, the EKB is transmitted along with content data as described above to allow the authorized devices to check the changed root key KR.

Assume that the content key E(KR', CK) encrypted by the changed root key KR' and an EKB be supplied for particular content data E(CK, A3D) as shown in FIG. 12. In this case, assume that the information of E(K0, KR') as a renewal root key KR' encrypted by the node key K0 for example be included in this EKB.

It should be noted that the encryption of the renewal root key KR' by the node key K0 presents an example in which the renewal root key KR' is sent to only the devices (SET0) through (SET3) shown in FIG. 11A for example. Obviously, if only the devices (SET0) and (SET1) are to be notified of the renewal root key KR', an EKB including the information of E(K00, KR') obtained by encrypting the renewal root key KR' by the node key K00 may be issued.

On the other hand, the DNK of the recording/reproducing apparatus 20A stores the leaf key K000 and E(K000, K00), E(K000, K0), and E(K000, KR) as the node keys encrypted by the leaf key and the root key as shown in FIG. 11B.

In this state, a procedure for decrypting content data A3D is shown in 1̂ through 4̂ in FIG. 12.

1̂ First, in response to the reception of the information of E(K0, KR') as an EKB, K0 is obtained from the DNK. Namely, the node key K0 is obtained by decrypting D{K000, E(K000, K0)} by use of the leaf key K000.

2̂ Next, by use of the node key K0, E(K0, KR') by the EKB is decoded. Namely, the renewal root key KR' is obtained by decrypting D{K0, E(K0, KR')}.

3̂ By use of decoded renewal root key KR', supplied content key E(KR', CK) is decoded. Namely, the content key CK is obtained by decrypting D{KR', E(KR', CK)}.

4̂ Decrypted content data A3D is obtained by decoding D{CK, E(CK, A3D)} by use of the decoded content key CK.

By the above-mentioned procedure, the recording/reproducing apparatus 20A can decrypt the transferred encrypted content data to record the decrypted content data to the MiniDisc 100.

In the case of the recording/reproducing apparatus 20B, before reproducing the content data recorded as encrypted to a secondary recording medium, the encrypted content data are decrypted by following the above-mentioned procedure, thereby reproducing music for example.

8. Content Transfer Processing

Figure 13:
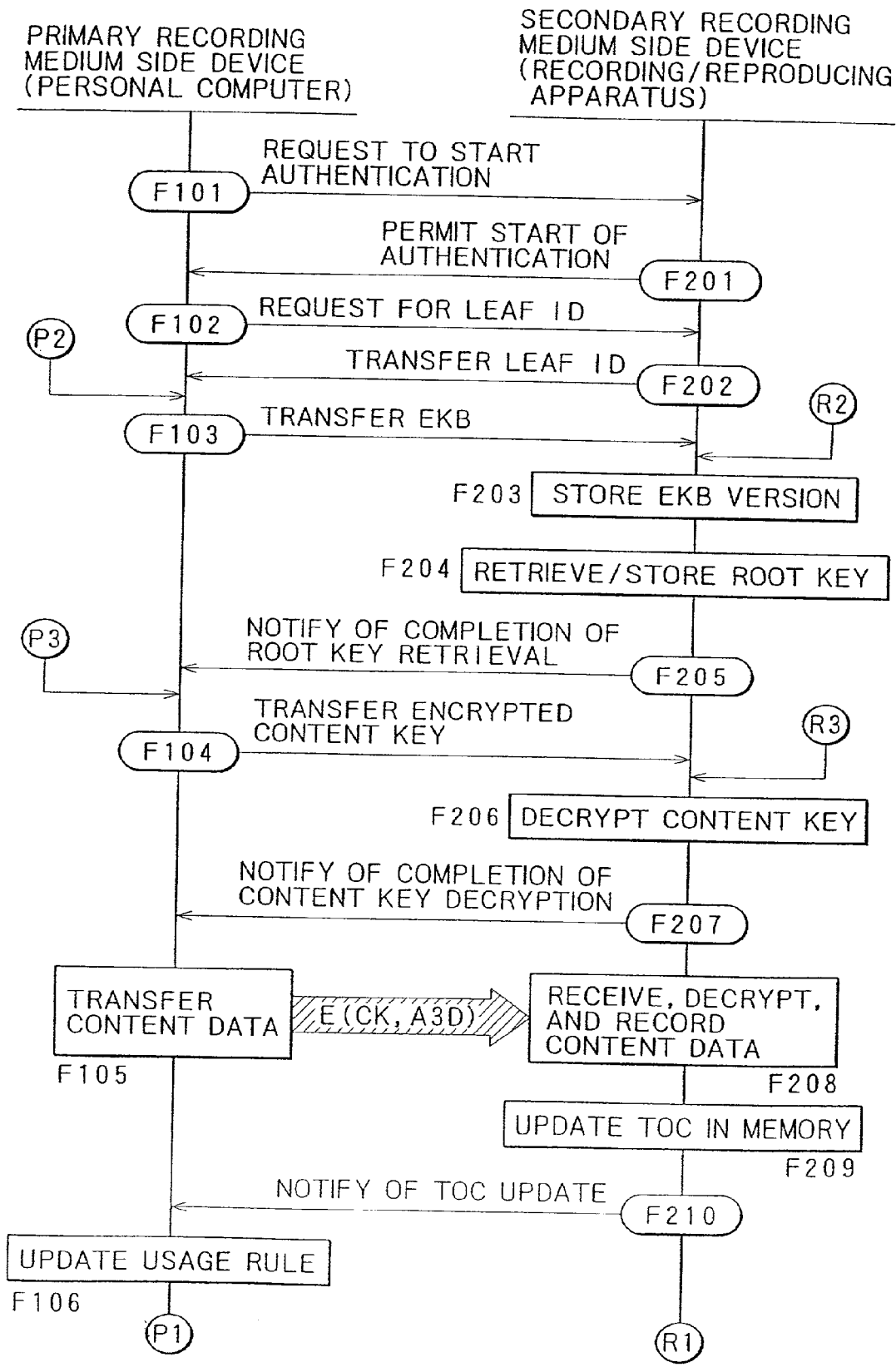
FIG. 13 is a flowchart describing processing for checking out content data between the primary recording medium side device and the secondary recording medium side device.
Figure 14:
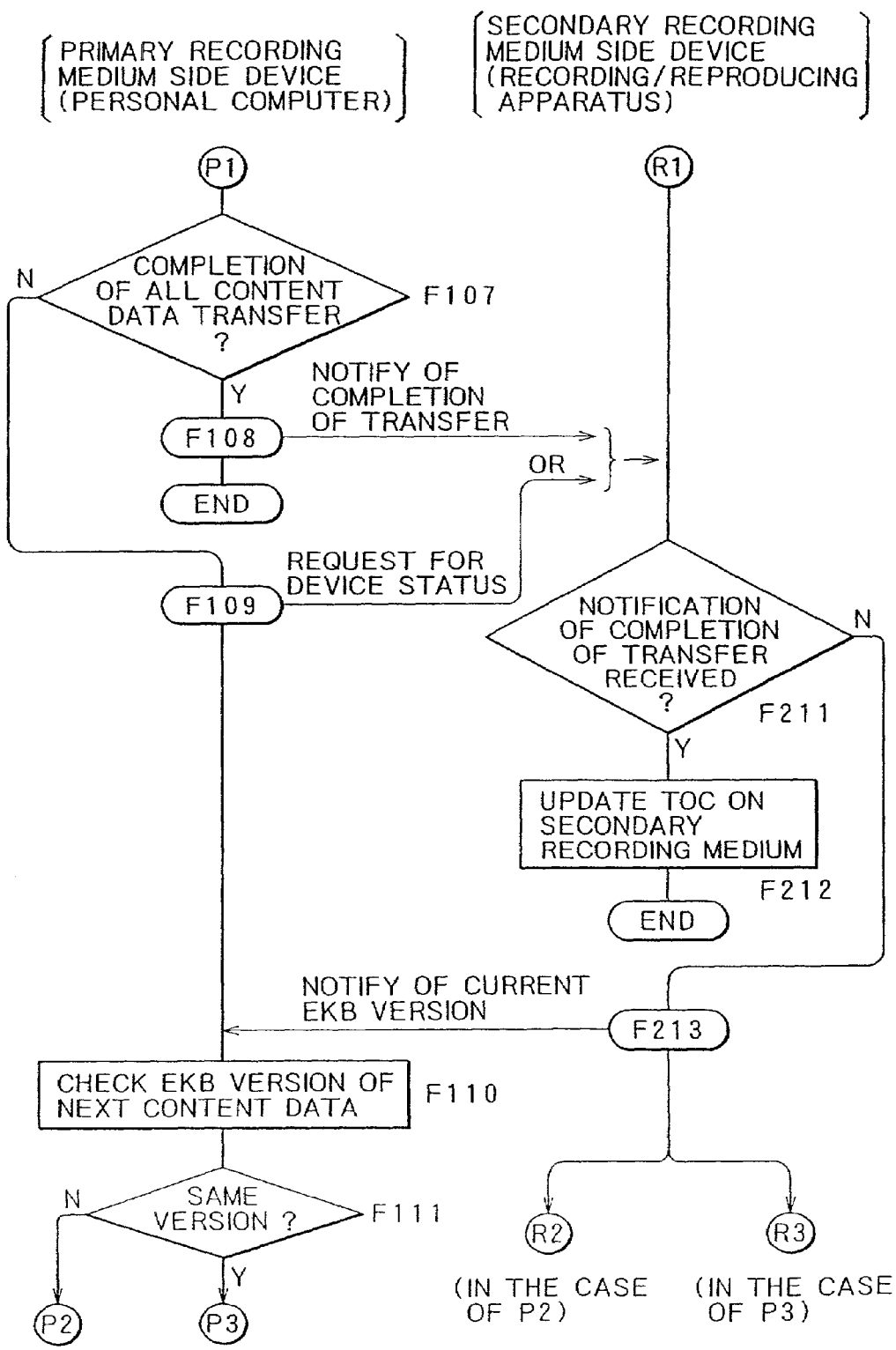
FIG. 14 is another flowchart describing processing for checking out content data between the primary recording medium side device and the secondary recording medium side device.

The following describes content transfer processing by which one or more pieces of content data stored in the HDD 5 of the personal computer 1 are transferred to the recording/reproducing apparatus 20A for recording to the MiniDisc 100, with reference to FIGS. 13 and 14.

In FIGS. 13 and 14, the control processing to be executed by the CPU 2 of the personal computer 1 is indicated by steps F101 through F111 and the control processing to be executed by the CPU 21 of the recording/reproducing apparatus 20A is indicated by steps F201 through F213.

It should be noted that each piece of content data distributed from the external server 91 and stored in the HDD 5 as described above may be different from one another in the root key KR encrypting the content key CK. Obviously, the root key KR which is common to two or more pieces of content data. On the other hand, as for the content data ripped from media such as CD and stored in the HDD 5, the content key CK is often encrypted by use of a common root key.

Namely, for the content data transferred to the recording/reproducing apparatus 20A, a common root key KR and an individually set root key KR' are coexistent for decrypting a content key CK; hence, basically at the time of transfer, root key KR must be checked for each piece of content data as described with reference to FIG. 1B (steps d3, d8, and d11 in FIG. 1B). Further, the authentication processing is executed for each piece of content data accordingly (steps d1, d6, and d11 in FIG. 1B). Still further, because transfer/recording processing is executed for each piece content data, the recording/reproducing apparatus 20A updates U-TOC, which is control information, on the MiniDisc 100 every time each piece of content data has been recorded to the MiniDisc 100 (steps d5, d10, and d15 in FIG. 1B). For these reasons, the processing of transferring/recording two or more pieces of content data takes a long time. The present embodiment is intended to make this processing more efficient.

In order to transfer a particular piece of content data stored in the HDD 5, the CPU 2 requests the recording/reproducing apparatus 20A for starting authentication in step F101 shown in FIG. 13.

In response, the recording/reproducing apparatus 20A sends authentication start permission to the personal computer 1 in step F201.

In response, the personal computer 1 requests the recording/reproducing apparatus 20A for a leaf ID in step F102. In response, the recording/reproducing apparatus 20A sends the requested leaf ID in step F202.

It should be noted that the personal computer 1 authenticates the connected recording/reproducing apparatus 20A to check whether this apparatus has the currently valid leaf ID by checking the supplied leaf ID; at the same time, in the case of the non-SDMI-compliant recording/reproducing apparatus 20A, which decrypts content data before recording to a secondary recording medium, the authentication processing described in FIG. 9 is also executed (omitted in FIG. 13).

When the authentication has been completed, the personal computer 1 sends the EKB of the content data to be transferred this time to the recording/reproducing apparatus 20A in step F103.

Receiving the EKB, the recording/reproducing apparatus 20A stores the version number of the received EKB in step F203 (refer to FIG. 4). Further, in step F204, the recording/reproducing apparatus 20A searches for the root key KR for the content data to be transferred this time by following the steps 1̂ and 2̂ shown in FIG. 12 by use of the received EKB and the stored DNK, storing the retrieved root key KR.

Then, in step F205, the recording/reproducing apparatus 20A notifies the personal computer 1 of the completion of the root key search operation in step F205.

Next, in step F104, the personal computer 1 sends an encrypted content key E(KR, CK) associated with the content data to be transferred this time.

In response, the recording/reproducing apparatus 20A decrypts the received encrypted content key E(KR, CK) by use of the stored root key KR by following the step 3̂ shown in FIG. 12 in step F206, thereby decrypting the content key CK. Then, in step F207, the recording/reproducing apparatus 20A notifies the personal computer 1 of the completion of the content key CK decryption.

This notification allows the personal computer 1 to recognize that the preparations for content data decryption on the side of the recording/reproducing apparatus 20A have been completed, so that the personal computer 1 transfers the content data in step F105. Namely, the personal computer 1 sends content data E(CK, A3D) encrypted by the content key CK.

In step F208, the recording/reproducing apparatus 20A receives the supplied content data E(CK, A3D), decrypts the received content data by the content key CK by following step 4̂ shown in FIG. 12, and records the decrypted content data A3D to the MiniDisc 100.

When the recording of one piece of content data (for example, one piece of music) has been transferred from the personal computer 1 and recorded to the MiniDisc 100, the U-TOC on the MiniDisc 100 must be updated. On the MiniDisc 100, the start address/end address of each track providing a unit for one piece of music for example and other information are managed in the U-TOC recorded to the inner periphery of the MiniDisc 100. At track reproduction, the U-TOC is referenced for the address concerned on the MiniDisc 100.

In the present embodiment, however, at the end of recording of one piece of content to the MiniDisc 100, the U-TOC is updated only in memory as shown in step F209 and therefore not updated on the MiniDisc 100. For example, the U-TOC data read by the CPU 21 from the MiniDisc 100 into its internal memory are held therein; however, in step F209, the contents of the U-TOC associated with the writing of content data this time are updated only in the internal memory.

Then, when the U-TOC has been updated in the memory, the recording/reproducing apparatus 20A notifies the personal computer 1 of the U-TOC update, namely of the completion of the writing of one piece of content data.

In response, in step F106, the personal computer 1 updates the usage rule associated with the transferred content data. For example, the checkout count for the transferred content data is incremented as described before.

Next, the process on the side of the personal computer 1 goes to step F107 shown in FIG. 14 indicated as "P1" and the process on the side of the recording/reproducing apparatus 20A goes to step F211 shown in FIG. 14 indicated as "R1."

In step F107 shown in FIG. 14, the personal computer 1 determines whether or not the transfer of all of one or more pieces of content data has been completed.

If the content data have all been transferred, then the personal computer 1 notifies the recording/reproducing apparatus 20A of the completion of the transfer in step F108, upon which the sequence of processes comes to an end.

On the other hand, if the transfer of the content data need be continued, the personal computer 1 requests the recording/reproducing apparatus 20A for the device status in step F109.

In the recording/reproducing apparatus 20A, the process branches depending on whether the supplied information is the notification of the end of content data transfer or the request for device status in step F211.

In the case of the request for device status, the transfer of content data is continued. For the continuation, the process of the recording/reproducing apparatus 20A goes to step F213 to report the version of the stored EKB to the personal computer 1. Namely, this version is the version number stored in step F203.

Receiving the EKB version number, the personal computer 1 checks the version number of the EKB of the content data to be transferred next in step F110 to see whether the version number is the same as the version number notified above.

If the received version number is the same as the notified version number, it indicates that the root key by which the content key CK is encrypted is the same. In the personal computer 1, the process branches depending on whether the version number is the same or not.

If the version number of the EKB of the content data to be transferred is different from the version number of the EKB stored in the recording/reproducing apparatus 20A, it indicates that the recording/reproducing apparatus 20A does not hold the EKB for obtaining the content key CK of the content data concerned, so that the process returns to step F103 shown in FIG. 13 indicated as "P2," thereby transmitting the EKB of the content data to be transferred.

In this case, the process on the side of the recording/reproducing apparatus 20A starts from step F203 shown in FIG. 13 indicated as "R2."

Then, as with described above, the EKB version is stored, the root key KR is retrieved, and the completion of retrieval is notified in steps F203, F204, and F205 respectively. The content key CK is checked in step F104 in the personal computer 1 and steps F206 and F207 in the recording/reproducing apparatus 20A and content data are transferred/recorded in steps F105 and F208.

On the other hand, if the version number of the EKB of the content data to be transferred next is found in step F111 shown in FIG. 14 to be the same as the version number of the EKB stored in the recording/reproducing apparatus 20A, it indicates that the root key KR for obtaining the content key CK of the content data has already been checked by the recording/reproducing apparatus 20A. Therefore, the process in the personal computer 1 returns to step F104 shown in FIG. 13 indicated as "P3," thereby transferring the encrypted content key. Namely, in this case, the transfer of EKB is not performed.

In this case, the process in the recording/reproducing apparatus 20A starts from step F206 shown in FIG. 13 indicated as "R3."

In steps F206 and F207, the content key CK is checked and, in steps F105 and F208, the content data are transferred/recorded.

When the transfer/recording of all pieces of content data has been completed, the process of the personal computer 1 goes from step F107 to F108 shown in FIG. 14 to perform end notification. In response to this end notification, the process of the recording/reproducing apparatus 20A goes from step F211 to F212, in which the recording/reproducing apparatus 20A transfers the U-TOC data stored in the internal memory of the CPU 21 to the recording/reproducing block 25, writing the U-TOC data to the MiniDisc 100.

Namely, every time one piece of content data is recorded to the MiniDisc 100, the U-TOC data are updated in the internal memory of the CPU 21 in step F209. Therefore, when all pieces of content data have been recorded to the MiniDisc 100, the U-TOC data in the internal memory of the CPU 21 reflect all pieces of content data written to the MiniDisc 100. By recording the resultant most recent U-TOC data to the MiniDisc 100, the written content data become valid (reproducible).

Then, when the U-TOC data have been written to the MiniDisc 100, the above-mentioned sequence of processes comes to an end.

Figure 15A:
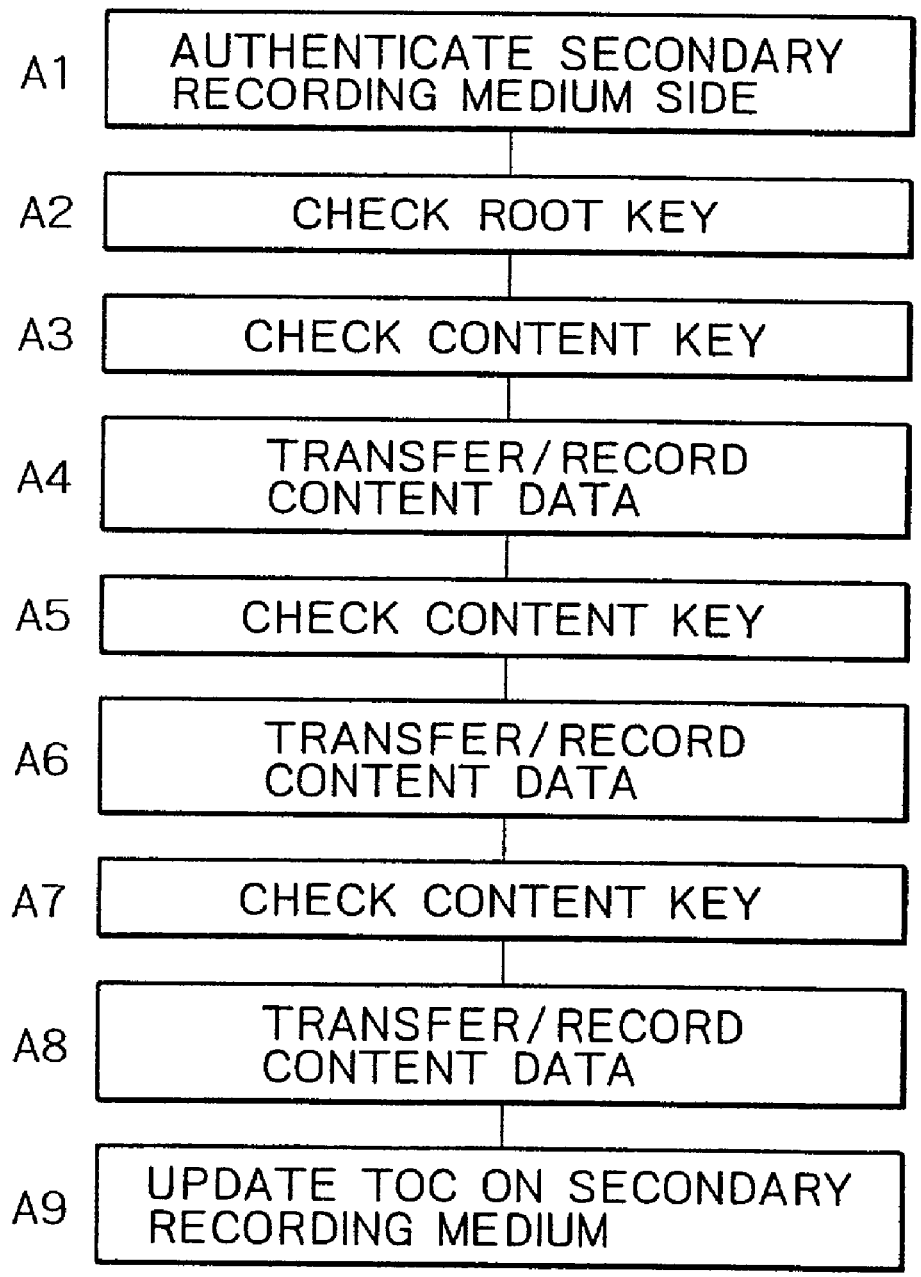
FIG. 15A is a flowchart describing a procedure of processing to be executed when all versions of the EKBs for a plurality pieces of content data to be transmitted from the primary recording medium side device to the secondary recording medium side device are the same.
Figure 15B:
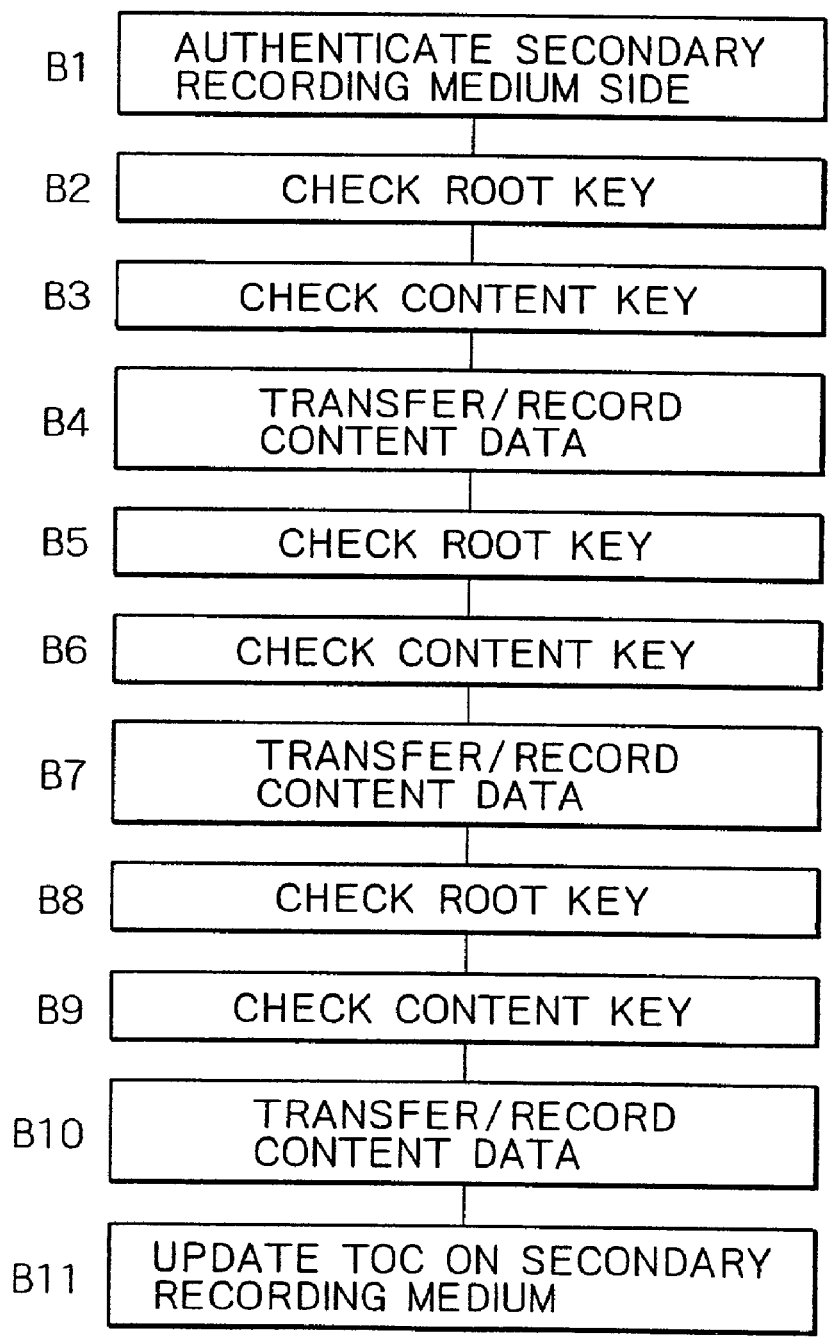
FIG. 15B is a flowchart describing a procedure of processing to be executed when all versions of the EKBs for a plurality of pieces of content data to be transmitted from the primary recording medium side device to the secondary recording medium side device are different.

As described above, in the present embodiment, when continuously transferring plural pieces of content data if the versions of the EKBs of these content data are the same, the transmission of the EKBs and the associated root key search processing are omitted. The authentication processing is performed only at the beginning of the sequence of processes. In addition, the U-TOC update processing on the MiniDisc 100 is executed upon completion of the sequence of content data writing operations. Consequently, the efficiency of the transfer/recording processing of plural pieces of content data is enhanced, thereby significantly reducing the time required for the transfer/recording of content data. Referring to FIGS. 15A and 15B, there is shown a processing process for the transfer of content data in the present embodiment as compared with the example shown in FIGS. 1A and 1B.

FIG. 15A shows an example in which, in transferring/recording three pieces of content data, the versions of the EKBs of these three pieces of content data are the same. In this case, first, the secondary recording medium side is authenticated in step A1. In step A2, the root key KR is checked by EKB transmission. In step A3, the content key CK is checked. In step A4, content data are transferred/recorded. At this time, the U-TOC is not updated on the MiniDisc. In step A5, the content key CK of the second piece of content data is checked. In step A6, the second piece of content data is transferred/recorded. In step A7, the content key CK of the third piece of content data is checked. In step A8, the third piece of content data is transferred/recorded. Finally, in step A9, the U-TOC is updated on the MiniDisc 100.

As seen from the comparison between FIGS. 15A and 15B, the efficiency of the transfer/recording processing is significantly enhanced.

As shown in FIG. 15A, the content key checking processing and the content transfer/recording are repetitively executed. In the content key checking processing, the EKB version stored in the memory corresponding to the content data already received in step F203 of the secondary recording medium side device described with reference to FIG. 13 is compared with the version of an EKB which is newly transferred in step F103 to see whether or not these EKBs are the same (not shown).

If the EKB version of the content data previously received is found matching the EKB version of the content data to be received this time, the root key checking processing can be skipped.

FIG. 15B shows an example in which, when transferring/recording three pieces of content data, the versions of the EKBs of these pieces of content data are different from each other.

In this case, at first, the secondary recording medium side is authenticated in step B1. In step B2, the root key KR is checked by EKB transmission. In step B3, the content key CK is checked. In step B4, the content data are transferred/recorded. At this time, the U-TOC is not updated on the MiniDisc. In step B5, the root key KR is checked by the transmission of the EKB of the second piece of content data. In step B6, the content key CK of the second piece of content data is checked. In step B7, the second piece of content data is transferred/recorded. In step B8, the root key KR is checked by the transmission of the EKB of the third piece of content data. In step B9, the content key CK of the third piece of content data is checked. In step B10, the third piece of content data is transferred/recorded. Finally, in step B11, the U-TOC is updated on the MiniDisc 100.

In the case of FIG. 15B, the efficiency of the transfer/recording processing is also enhanced as compared with the example shown in FIG. 1B.

The present invention is not limited to the above-mentioned embodiments.

For example, a variation is possible in which the recording/reproducing apparatus 20A keeps storing as long as possible the EKB version and the EKB (or the retrieved root key KR) stored in step F203.

Namely, every supplied EKB is accumulatively held in the recording/reproducing apparatus 20A, so that, when the content data having the same EKB version are transferred, the EKB transmission and the root key checking can be omitted.

For example, when transferring plural pieces of content data having different EKB versions, if the recording/reproducing apparatus 20A stores the same EKB version as the EKB version of a particular piece of content data, the checking of root key KR of that piece of content data can be omitted.

Obviously, when a single piece of content data is transferred rather than plural pieces, if any of the stored, past EKBs (or root keys KRs) corresponds to the EKB of this piece of content data, the processing for transferring a new EKB to search for a root key KR can be omitted.

In the above-mentioned embodiments, the content key CK was described as encrypted by the root key KR. It is also possible for the content key CK to be encrypted by a node key below the root key KR and transferred.

The object of the above-described data transfer from the primary recording medium to the secondary recording medium is not limited to SDMI content; various other types of content data may also be transferred from the primary recording medium to the secondary recording medium.

The primary recording medium may be other than the HDD.

obviously, the secondary recording medium and the secondary recording medium side device 20A may be other than a MiniDisc and a MiniDisc recording apparatus respectively. For example, the secondary recording medium 100 may be any of CD-R, CD-RW, DVD-RAM, DVD-R, DVD-RW, and various types of memory cards. Therefore, the secondary recording medium side device 20A may be any recording apparatus that is compatible with these media.

As referred to with the SDMI-compliant recording/reproducing apparatus 20B, the present invention is also applicable to the transfer of content data to the recording/reproducing apparatus 20B.

As described and according to the invention, when transmitting plural pieces of content data from a data transfer apparatus on the primary recording medium side to a data recording apparatus to record the transferred content data to a secondary recording medium, if the enabling information (EKB) of the following (the second and subsequent) pieces of content data is the same as the enabling information of the content data transferred before, only the first key (content key) and the content data are transferred. Consequently, the efficiency of checking the second key (root key KR and so on) by the enabling information can be enhanced.

In addition, the above-mentioned data recording apparatus to which content data are transferred is authenticated whether the content data can be transferred only before the transfer of the first piece of content data starts, so that the efficiency of the authentication processing can be enhanced.

Moreover, on the side of the data recording apparatus, at the end of the recording of one or more pieces of content data to a secondary recording medium, the management information for this recording is updated on the secondary recording medium, thereby enhancing the efficiency of the management information update processing on the secondary recording medium.

Consequently, the efficiency of the processing of transferring content data, especially the processing of transferring/recording plural pieces of content data is enhanced, thereby providing advantages of significantly reduced transfer processing time.

What is claimed is:

1. A method for recording encrypted content data selected from among a plurality of pieces of encrypted content data recorded from a primary recording medium to a secondary recording medium which is different from said primary recording medium, said method comprising the steps of:

firstly, receiving an enabling key block of a first piece of encrypted content data for restoring a root key of a hierarchical key group transmitted from said primary recording medium;

searching for said root key by use of said enabling key block;

receiving an encrypted content key associated with said first piece of encrypted content data;

secondly, receiving said first piece of encrypted content data from said primary recording medium after the searching for said root key;

decrypting said first piece of encrypted content data received in said second receiving step;

recording the first piece of content data decrypted in said decrypting step to said secondary recording medium;

determining, if an additional and subsequent piece of encrypted content data is transferred from said primary recording medium to said secondary recording medium, whether an enabling key block of said additional and subsequent piece of encrypted content data is common to an enabling key block of said first piece of encrypted content data; and transferring only said additional and subsequent piece of encrypted content data and encrypted content key to said secondary recording medium, if it is determined that the enabling key block of said additional and subsequent piece of encrypted content data is common to said enabling key block of said first piece of encrypted content data.

2. The method according to claim 1, wherein said secondary recording medium has a program area for recording plaintext content data obtained by decrypting the encrypted content data transmitted from said primary recording medium and a management area for managing a recording position of said plaintext content data recorded in said program area, and wherein said method further comprises the step of updating said management area after said selected desired piece of content data is recorded to said program area of said secondary recording medium.

3. A system for transferring encrypted content data selected from a plurality of pieces of content data recorded from a primary recording medium to a secondary recording medium which is different from said primary recording medium, said system comprising:

reception means for receiving a first piece of encrypted content data transferred from said primary recording medium and an enabling key block of said first piece of encrypted content data for restoring a root key for a hierarchical key group;

restoration means for restoring said root key by use of said enabling key block received by said reception means and any one of device node keys stored in a storage means;

confirmation means for confirming a version of said enabling key block received by said reception means;

verification means for verifying, if an additional and subsequent piece of encrypted content data is transferred, whether an enabling key block of said additional and subsequent piece of encrypted content data is common to said enabling key block of said first piece of encrypted content data; and transferring only said additional and subsequent piece of encrypted content data and encrypted content key to said secondary recording medium, if it is determined that said enabling key block of said additional and subsequent piece of encrypted content data is common to said enabling key block of said first piece of encrypted content data.

4. The system according to claim 3, wherein said secondary recording medium has a program area for recording plaintext content data obtained by decrypting the encrypted content data transmitted from said primary recording medium and a management area for managing a recording position of said plaintext content data recorded in said program area, and wherein said data transfer system further comprises update means for updating said management area after said selected desired piece of content data is recorded to said program area of said secondary recording medium.

5. The method according to claim 1, wherein said content key is decrypted by use of said root key, and said content data is decrypted by use of said content key.

6. The method according to claim 1, further comprising:

updating a management data on said secondary recording medium when all pieces of content data have been recorded to said secondary recording medium.

7. A method for transferring a plurality of pieces of encrypted content data recorded to a primary recording medium from a transfer apparatus to a recording apparatus having a secondary recording medium, said method comprising the steps of:

authenticating said secondary recording medium;

sending an enabling key block of a first piece of encrypted content data from said transfer apparatus to said recording apparatus;

sending an encrypted content key from said transfer apparatus to said recording apparatus;

transferring said first piece of encrypted content data from said transfer apparatus to said recording apparatus;

checking, if an additional and subsequent piece of encrypted content data is transferred, whether an enabling key block of said additional and subsequent piece of encrypted content data is common to said enabling key block of said first piece of encrypted content data; and transferring only said additional and subsequent piece of encrypted content data and encrypted content key, if it is determined that the enabling key block of said additional and subsequent piece of encrypted content data is common to said enabling key block of said first piece of encrypted content data.

8. The method according to claim 7, wherein said content key is decrypted by use of said root key, and said content data is decrypted by use of said content key.

9. An apparatus for transferring a plurality of pieces of encrypted content data to a recording apparatus having a secondary recording medium, said apparatus comprising:

sending means for sending an enabling key block of a first piece of encrypted content data from said transfer apparatus to said recording apparatus, an encrypted content key from said transfer apparatus to said recording apparatus, and said first piece of encrypted content data to said recording apparatus;

verification means for verifying, if an additional and subsequent piece of content data is transferred, whether an enabling key block of said additional and subsequent piece of encrypted content data is common to said enabling key block of said first piece of encrypted content data; and control means for controlling only the transfer of said additional and subsequent piece of encrypted content data and encrypted content key, if it is determined that the enabling key block of said additional and subsequent piece of encrypted content data is common to said enabling key block of said first piece of encrypted content data.

10. The apparatus according to claim 9, wherein said content key is decrypted by use of said root key, and said content data is decrypted by use of said content key.

11. The apparatus according to claim 9, further comprising an authenticating means for authenticating said recording apparatus.

* * * * *